(12) United States Patent
Oh et al.

(10) Patent No.: US 12,482,930 B2
(45) Date of Patent: Nov. 25, 2025

(54) ELECTRONIC DEVICE INCLUDING COIL ANTENNA

(71) Applicant: SAMSUNG ELECTRONICS CO., LTD., Suwon-si (KR)

(72) Inventors: Chanhee Oh, Suwon-si (KR); Sungsoo Kim, Suwon-si (KR); Yongyoun Kim, Suwon-si (KR); Seyoon Bae, Suwon-si (KR); Seungbum Choi, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 18/311,537

(22) Filed: May 3, 2023

(65) Prior Publication Data

US 2023/0318173 A1 Oct. 5, 2023

Related U.S. Application Data

(63) Continuation of application No. PCT/KR2021/019422, filed on Dec. 20, 2021.

(30) Foreign Application Priority Data

Dec. 21, 2020 (KR) ........................ 10-2020-0179908

(51) Int. Cl.
*H01Q 1/52* (2006.01)
*H01Q 7/00* (2006.01)
(Continued)

(52) U.S. Cl.
CPC ............... *H01Q 1/526* (2013.01); *H01Q 7/00* (2013.01); *H04B 5/70* (2024.01); *H05K 1/118* (2013.01); *H05K 1/147* (2013.01)

(58) Field of Classification Search
CPC . H01Q 1/526; H01Q 7/00; H04B 5/26; H04B 5/70; H05K 1/118; H05K 1/147
See application file for complete search history.

(56) References Cited

U.S. PATENT DOCUMENTS

| 9,246,352 B2 | 1/2016 | Park et al. |
| 9,941,576 B2 | 4/2018 | Ito et al. |

(Continued)

FOREIGN PATENT DOCUMENTS

| CN | 107912075 A | 4/2018 |
| EP | 3531814 | 8/2019 |

(Continued)

OTHER PUBLICATIONS

International Search Report for PCT/KR2021/019422 mailed Apr. 12, 2022, 6 pages.

(Continued)

*Primary Examiner* — Thien M Le
(74) *Attorney, Agent, or Firm* — Nixon & Vanderhye P.C.

(57) ABSTRACT

An electronic device, according to various embodiments of the present disclosure, may comprise: a housing, a first circuit board disposed in the housing; flexible circuit boards electrically connected to the first circuit board, coil antennas disposed inside the housing and including a plurality of antennas having conductive patterns provided and configured to generate magnetic fields, a shielding layer disposed below a first antenna from among the plurality of antennas and metal shields disposed about side surfaces of the coil antennas and configured to shield a magnetic field in a first direction from among magnetic fields formed by the coil antennas.

20 Claims, 23 Drawing Sheets

(51) Int. Cl.
  *H04B 5/70* (2024.01)
  *H05K 1/11* (2006.01)
  *H05K 1/14* (2006.01)

(56) References Cited

U.S. PATENT DOCUMENTS

| | | | |
|---|---|---|---|
| 9,997,952 | B2 | 6/2018 | Yamaguchi et al. |
| 10,236,942 | B2 | 3/2019 | Lee et al. |
| 10,516,208 | B2 | 12/2019 | Lee et al. |
| 11,510,328 | B2 | 11/2022 | Kim |
| 11,665,818 | B2 | 5/2023 | Lee et al. |
| 2009/0054113 | A1* | 2/2009 | Kojima ............. H01Q 1/243 455/575.3 |
| 2010/0207824 | A1* | 8/2010 | Ide ..................... H01Q 1/243 343/702 |
| 2011/0234462 | A1* | 9/2011 | Aoki .................. H01Q 1/243 343/702 |
| 2016/0233581 | A1 | 8/2016 | Kim et al. |
| 2017/0290184 | A1* | 10/2017 | Kim .................. H04M 1/0277 |
| 2018/0040950 | A1* | 2/2018 | Lee ..................... H01Q 1/526 |
| 2018/0070482 | A1 | 3/2018 | Choi et al. |
| 2018/0131087 | A1* | 5/2018 | Kim .................... H05K 9/0026 |
| 2018/0174747 | A1 | 6/2018 | Hirobe et al. |
| 2018/0219400 | A1 | 8/2018 | Jin |
| 2018/0366264 | A1 | 12/2018 | Wambugu Ngahu et al. |
| 2019/0121396 | A1* | 4/2019 | Ha ....................... H01Q 1/44 |
| 2019/0372228 | A1 | 12/2019 | Lee et al. |
| 2020/0044484 | A1 | 2/2020 | Lee et al. |
| 2020/0058015 | A1* | 2/2020 | Lee ....................... H04B 5/26 |
| 2020/0267834 | A1 | 8/2020 | Lee et al. |
| 2020/0303955 | A1 | 9/2020 | Kim et al. |
| 2020/0313284 | A1 | 10/2020 | Kim et al. |
| 2020/0373784 | A1* | 11/2020 | Yun ..................... H02J 50/005 |
| 2021/0152680 | A1* | 5/2021 | Lee ....................... H04B 5/26 |
| 2021/0210836 | A1 | 7/2021 | Jang et al. |
| 2023/0171932 | A1* | 6/2023 | Yoon .................... H05K 9/0081 361/679.01 |

FOREIGN PATENT DOCUMENTS

| | | |
|---|---|---|
| JP | 2019004589 | 1/2019 |
| JP | 2019004589 A | 1/2019 |
| JP | 2019114221 | 7/2019 |
| JP | 2019114221 A | 7/2019 |
| KR | 101589029 B1 | 1/2016 |
| KR | 10-2016-0098959 | 8/2016 |
| KR | 20160098959 A | 8/2016 |
| KR | 101730792 B1 | 4/2017 |
| KR | 20170096877 A | 8/2017 |
| KR | 10-2018-0027964 | 3/2018 |
| KR | 20180027964 A | 3/2018 |
| KR | 102007824 | 7/2019 |
| KR | 102031091 B1 | 10/2019 |
| KR | 20200014126 | 2/2020 |
| KR | 10-2020-0101791 | 8/2020 |
| KR | 10-2020-0101809 | 8/2020 |
| KR | 20200101809 A | 8/2020 |
| KR | 20200111968 | 10/2020 |
| KR | 20200114150 | 10/2020 |
| KR | 20220015824 | 2/2022 |
| KR | 20220036756 | 3/2022 |
| KR | 20220086364 | 6/2022 |
| WO | 2017194029 A1 | 11/2017 |
| WO | 2019125089 A1 | 6/2019 |
| WO | 2020/197345 | 10/2020 |

OTHER PUBLICATIONS

Written Opinion of the ISA for PCT/KR2021/019422 mailed Apr. 12, 2022, 4 pages.
Korean Office Action issued Sep. 19, 2024 in corresponding Korean Patent Application No. 10-2020-017990.
Singapore Office Action issued Sep. 23, 2024 in corresponding Singapore Patent Application No. 11202303689X.
Extended European Search Report dated Feb. 19, 2024 issued in European Patent Application No. EP21911443.6.
Korean Office Action issued Jan. 17, 2024 in corresponding Korean Patent Application No. 10-2020-0179908.
Korean Notice of Patent Grant dated May 15, 2025 issued in Korean Patent Application No. 10-2020-0179908 and English translation, 5 pp.
Japanese Office Action dated Jun. 10, 2025 issued in Japanese Patent Application No. 2023-524947 and English translation, 16 pp.
Russian Office Action dated May 27, 2025 issued in Russian Patent Application No. 2023119137 and English translation, 17 pp.
Russian Decision to Grant a Patent for Invention dated Sep. 12, 2025 issued in Russian Patent Application No. 023119137 and English translation, 16 pp.

* cited by examiner

ELECTRONIC DEVICE INCLUDING COIL ANTENNA

CROSS-REFERENCE TO RELATED APPLICATIONS

This application is a continuation of International Application No. PCT/KR2021/019422 designating the United States, filed on Dec. 20, 2021, in the Korean Intellectual Property Receiving Office and claiming priority to Korean Patent Application No. 10-2020-0179908, filed on Dec. 21, 2020, in the Korean Intellectual Property Office, the disclosures of which are incorporated by reference herein in their entireties.

BACKGROUND

Field

The disclosure relates to an electronic device including a coil antenna.

Description of Related Art

Electronic devices (e.g., portable terminals) are becoming smaller and multifunctional, and for this purpose, printed circuit boards (e.g., a printed circuit board (PCB), a printed board assembly (PBA), and/or a flexible printed circuit board (FPCB)) mounted with various electronic components (e.g., a processor, a memory, a camera, a broadcasting receiving module, and/or a communication module) may be applied to the electronic devices. The printed circuit board may include circuit wires interconnecting the mounted electronic components.

In order to increase the use time of an electronic device, it is necessary to increase battery capacity. When a printed circuit board is separately disposed in an electronic device, it may be difficult to ensure a space for expanding battery capacity. In order to increase the battery capacity of an electronic device, it is necessary to reduce the thickness of a printed circuit board and to secure a battery expansion space.

Coil antennas such as antennas of near field communication (NFC), wireless power consortium (WPC), and/or magnetic secure transmission (MST) may be applied to electronic devices. Since a shielding layer (e.g., a shielding sheet) configured to block magnetic fields generated from a coil antenna is to be applied to an antenna coil area and a flexible circuit board (e.g., FPCB) area, the thicknesses of the antenna coil area and the flexible circuit board area increase and a space available for a battery (e.g., a battery space) is reduced.

SUMMARY

Embodiments of the disclosure provide an electronic device that is capable of blocking magnetic fields in the −Z-axis direction and ensuring thickness reduction to ensure a battery space when antenna coils (e.g., an NFC, a WPC, and/or an MST) are applied thereto.

Embodiments of the disclosure provide an electronic device that is capable of blocking magnetic fields in the −Z-axis direction while reducing the area of a shielding layer and capable of improving a recognition area and charging efficiency of wireless charging by increasing the area of a WPC.

The technical problems to be addressed by the disclosure are not limited to those described above, and other technical problems, which are not described above, may be clearly understood from the following description by a person ordinarily skilled in the related art, to which the disclosure belongs.

An electronic device according to various example embodiments of the disclosure may include: a housing, a first circuit board disposed in the housing, a flexible circuit board electrically connected to the first circuit board, a coil antenna disposed inside the housing and including a plurality of antennas on which a conductive pattern is provided to generate magnetic fields, a shielding layer disposed below a first antenna among the plurality of antennas, and a metal shield disposed on a side surface of the coil antenna and configured to shield a magnetic field in a first direction among the magnetic fields generated by the coil antenna.

An electronic device according to various example embodiments of the disclosure may include: a first housing, a second housing, a hinge disposed between the first housing and the second housing enabling the first housing and the second housing to be folded or unfolded with respect to each other, a first printed circuit board disposed in the first housing, a second printed circuit board disposed in the second housing, a flexible circuit board electrically interconnecting the first printed circuit board and the second printed circuit board, a coil antenna disposed inside the second housing and including a plurality of antennas on which a conductive pattern is provided and configured to generate magnetic fields, a shielding layer disposed below a first antenna among the plurality of antennas, and a metal shield disposed on a side surface of the coil antenna and configured to shield a magnetic field in a first direction among the magnetic fields generated by the coil antenna.

In addition, various effects directly or indirectly identified through the disclosure may be provided.

An electronic device according to an example embodiment of the disclosure is capable of blocking magnetic fields in the −Z axis direction generated from an antenna coil (e.g., an NFC, a WPC, and/or an MST) and is capable of ensuring thickness reduction to ensure a battery space.

An electronic device according to an example embodiment of the disclosure is capable of blocking magnetic fields in the −Z axis direction generated from an antenna coil (e.g., an NFC, a WPC, and/or an MST) while reducing the area of a shielding layer, and is capable of improving a recognition area and charging efficiency of wireless charging by expanding the area of a WPC.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar components may be denoted by the same or similar reference numerals.

DETAILED DESCRIPTION

Figure 1:
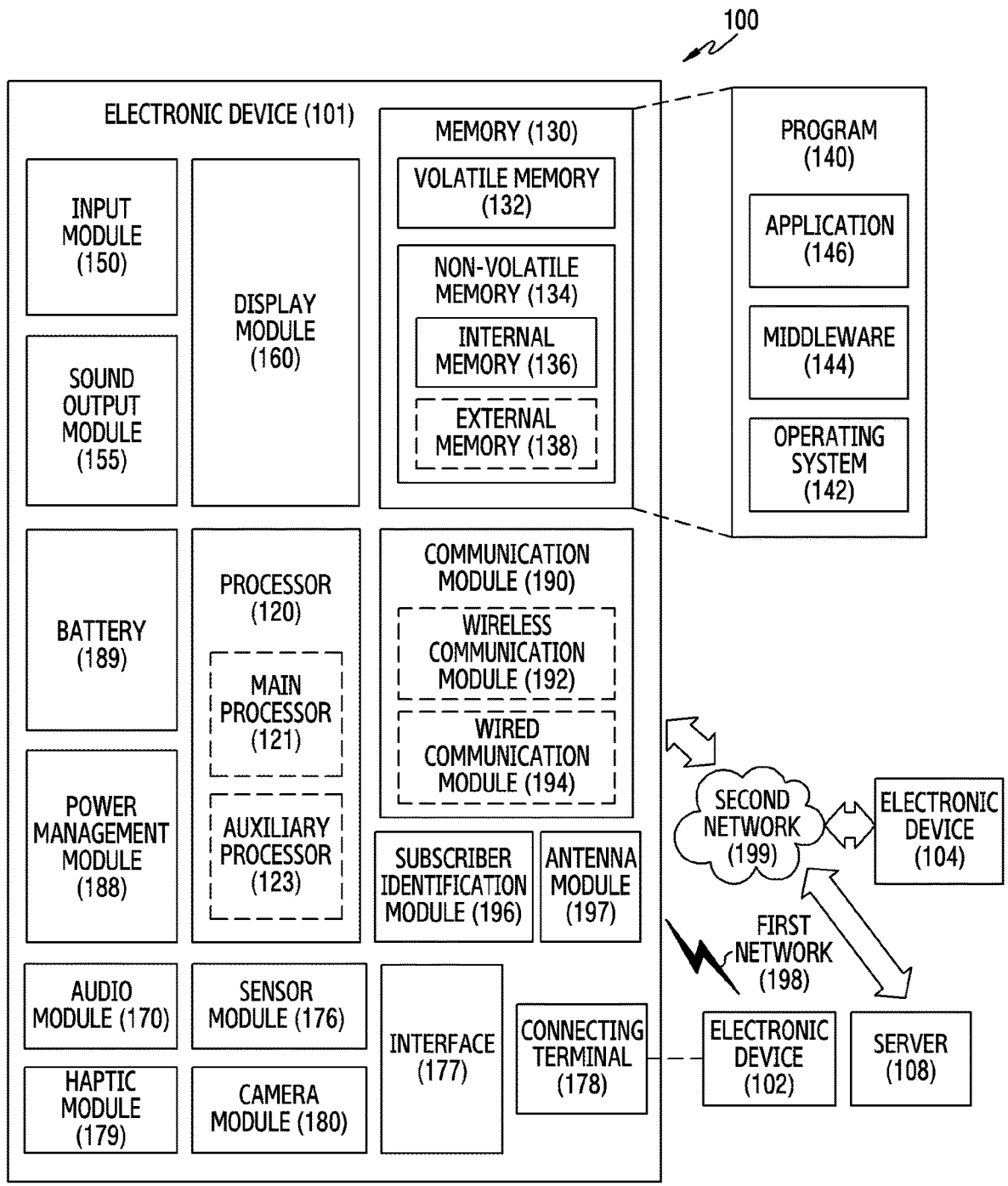
FIG. 1 is a block diagram illustrating an example electronic device in a network environment according to various embodiments.

Hereinafter, various example embodiments will be described with reference to the accompanying drawings. For convenience of description, the components illustrated in the drawings may be exaggerated or reduced in size, and the disclosure is not necessarily limited to the illustrated ones.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., a neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
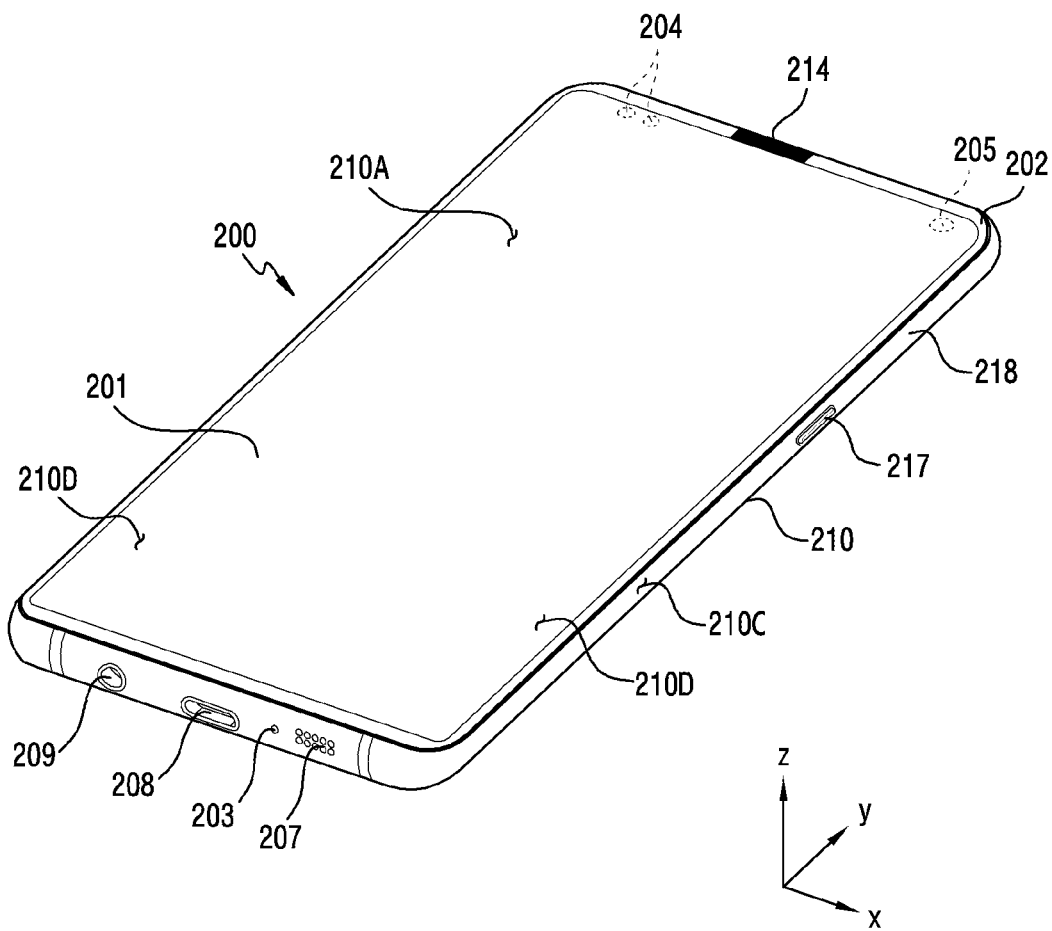
FIG. 2A is a front perspective view illustrating an electronic device according to various embodiments.
Figure 2B:
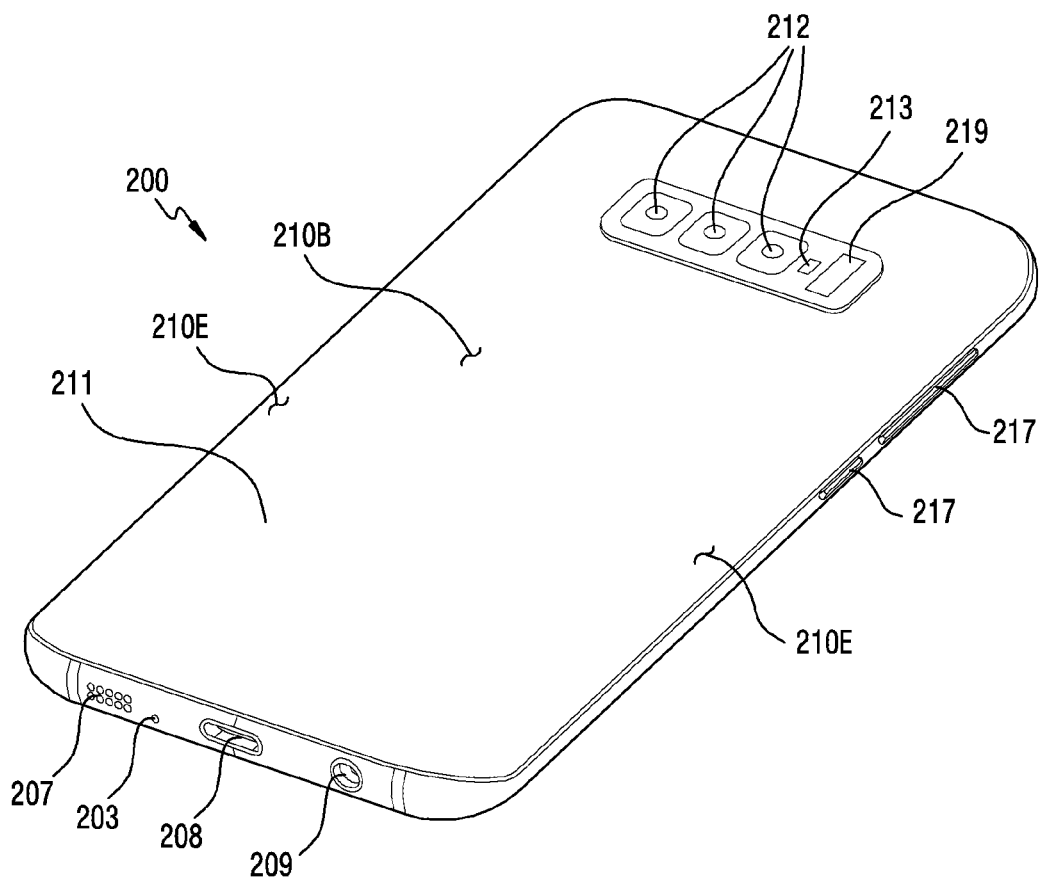
FIG. 2B is a rear perspective view illustrating an electronic device according to various embodiments.

FIG. 2A is a diagram illustrating a front perspective view of an electronic device according to various embodiments. FIG. 2B is a diagram illustrating a rear perspective view illustrating the electronic device according to various embodiments.200

Referring to FIGS. 2A and 2B, an electronic device 200 (e.g., the electronic device 101 in FIG. 1) according to an embodiment may include a housing 210 including a first surface (or a front surface) 210A, a second surface (or a rear surface) 210B, and a side surface 210C surrounding the space between the first surface 210A and the second surface 210B. In an embodiment (not illustrated), the housing may refer to a structure defining some of the first surface 210A, the second surface 210B, and the side surface 210C.

According to an embodiment, the first surface 210A may be at least partially defined by a substantially transparent front surface plate 202 (e.g., a glass plate or a polymer plate including various coating layers). The second surface 210B may be defined by a substantially opaque rear surface plate 211. The rear surface plate 211 may be made of, for example, coated or colored glass, ceramic, polymer, metal (e.g., aluminum, stainless steel (STS), or magnesium), or a combination of two or more of these materials. The side surface 210C may be defined by a side surface bezel structure 218 (or a "side surface member") coupled to the front surface plate 202 and the rear surface plate 211 and including metal and/or polymer. In various embodiments, the rear surface plate 211 and the side surface bezel structure 218 may be integrated and may include the same material (e.g., a metal material such as aluminum).

In the illustrated embodiment, the front surface plate 202 may include two first areas 210D, which are bent from the first surface 210A toward the rear surface plate 211 and extend seamlessly, at the long opposite side edges thereof. In the illustrated embodiment (see FIG. 2B), the rear surface plate 211 may include, at the long opposite side edges thereof, two second areas 210E, which are bent from the second surface 210B toward the front surface plate 202 and extend seamlessly. In various embodiments, the front surface plate 202 (or the rear surface plate 211) may include only one of the first areas 210D (or the second areas 210E). In various embodiments, some of the first areas 210D and the second areas 210E may not be included. In the above-described embodiments, when viewed from a side of the electronic device 200, the side surface bezel structure 218 may have a first thickness (or width) on the side where the first areas 210D or the second areas 210E are not included, and may have a second thickness, which is smaller than the first thickness, on the side where the first areas 210D or the second areas 210E are included.

According to an embodiment, the electronic device 200 may include at least one of a display 201 (e.g., the display module 160 in FIG. 1), an input device 203 (e.g., the input module 150 in FIG. 1), sound output devices 207 and 214 (e.g., the sound output module 155 in FIG. 1), sensor modules 204 and 219 (e.g., the sensor module 176 in FIG. 1), camera modules 205, 212, and 213 (e.g., the camera module 180 in FIG. 1), a key input device 217, an indicator (not illustrated), and connectors 208 and 209. In various embodiments, in the electronic device 200, at least one of the components (e.g., the key input devices 217 or the indicator) may be omitted, or other components may be additionally included.

The display 201 (e.g., the display module 160 in FIG. 1) may be visible, for example, through an upper portion of the front surface plate 202. In various embodiments, at least a portion of the display 201 may be visible through the front surface plate 202 defining the first surface 210A and the first areas 210D of the side surface 210C. The display 201 may be coupled to or disposed adjacent to a touch-sensitive circuit, a pressure sensor capable of measuring touch intensity (pressure), and/or a digitizer configured to detect a magnetic field-type stylus pen. In various embodiments, at least some of the sensor modules 204 and 219 and/or at least some of the key input devices 217 may be disposed in the first areas 210D and/or the second areas 210E.

In various embodiments (not illustrated), at least one of the audio module 214, the sensor module 204, the camera module 205 (e.g., an image sensor), and the fingerprint sensor may be included in the rear surface of the screen display area of the display 201. In various embodiments (not illustrated), the display 201 may be coupled to or disposed adjacent to a touch-sensitive circuit, a pressure sensor capable of measuring a touch intensity (pressure), and/or a digitizer configured to detect an electromagnetic field-type stylus pen. In various embodiments, at least some of the sensor modules 204 and 219 and/or at least some of the key input devices 217 may be disposed in the first areas 210D and/or the second areas 210E.

The input device 203 may include a microphone. In various embodiments, the input device 203 may include a plurality of microphones arranged to detect the direction of sound. The sound output devices 207 and 214 may include speakers 207 and 214. The speakers 207 and 214 may include an external speaker 207 and a receiver for communication (e.g., the audio module 214). According to various embodiments, the input device 203 (e.g., a microphone), the speakers 207 and 214, and the connectors 208 and 209 may be disposed in the space in the electronic device 200 and may be exposed to the external environment through one or more holes provided in the housing 210. According to various embodiments, the holes provided in the housing 210 may be commonly used for the input device 203 (e.g., a microphone) and the speakers 207 and 214. According to various embodiments, the speakers 207 and 214 may include a speaker that operates without a separate speaker hole provided in the housing 210 (e.g., a piezo speaker).

The sensor modules 204 and 219 (e.g., the sensor module 176 in FIG. 1) may generate electrical signals or data values corresponding to the internal operating state or the external environmental state of the electronic device 200. The sensor modules 204 and 219 may include, for example, a first sensor module 204 (e.g., a proximity sensor), a second sensor module (not illustrated) (e.g., a fingerprint sensor) disposed on the first surface 210A of the housing 210, and/or a third sensor module 219 (e.g., an HRM sensor) disposed on the second surface 210B of the housing 210. The fingerprint sensor may be disposed on the first surface 210A (e.g., the display 201) and/or the second surface 210B of the housing 210. The electronic device 200 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205 and 212 may include a first camera module 205 disposed on the first surface 210A of the electronic device 200, a second camera module 212 disposed on the second surface 210B, and/or a flash 213. The camera modules 205 and 212 may include one or more lenses, an image sensor, and/or an image signal processor. The flash 213 may include, for example, a light-emitting diode or a xenon lamp. The first camera module 205 may be disposed under the display panel in the form of an under-display camera (UDC). In various embodiments, two or more lenses (e.g., a wide-angle lens and a telephoto lens) and image sensors may be disposed on one surface of the electronic device 200. In various embodiments, multiple first camera modules 205 may be disposed on the first surface of the electronic device 200 (e.g., the surface on which a screen is to be displayed) in an under-display camera (UDC) manner.

The key input devices 217 may be disposed on the side surface 210C of the housing 210. In an embodiment, the electronic device 200 may not include some or all of the above-mentioned key input devices 217, and the key input devices 217, which are not included in the electronic device 200, may be implemented in another form, such as soft keys or touch keys, on the display 201. In various embodiments, the key input devices 217 may be implemented using pressure sensors included in the display 201.

The indicator may be disposed, for example, on the first surface 210A of the housing 210. The indicator may provide, for example, the state information of the electronic device 200 in an optical form. In an embodiment, the indicator may provide a light source that is interlocked with, for example, the operation of the camera module 205. The indicator may include, for example, an LED, an IR LED, and a xenon lamp.

The connectors 208 and 209 may include a first connector hole 208, which is capable of accommodating a connector (e.g., a USB connector) configured to transmit/receive power and/or data to/from an external electronic device, and/or a second connector hole (e.g., an earphone jack) 209, which is capable of accommodating a connector configured to transmit/receive an audio signal to/from an external electronic device.

Some of the camera modules 205 and 212 (e.g., the camera module 205), some of the sensor modules 204 and 219 (e.g., the sensor module 204), or the indicator may be disposed to be visible through the display 201. The camera module 205 may be disposed to overlap the display area, and a screen may also be displayed on the display area corresponding to the camera module 205. Some sensor modules 204 may be disposed in the inner space in the electronic device to perform the functions thereof without being visually exposed through the front surface plate 202.

Figure 3A:
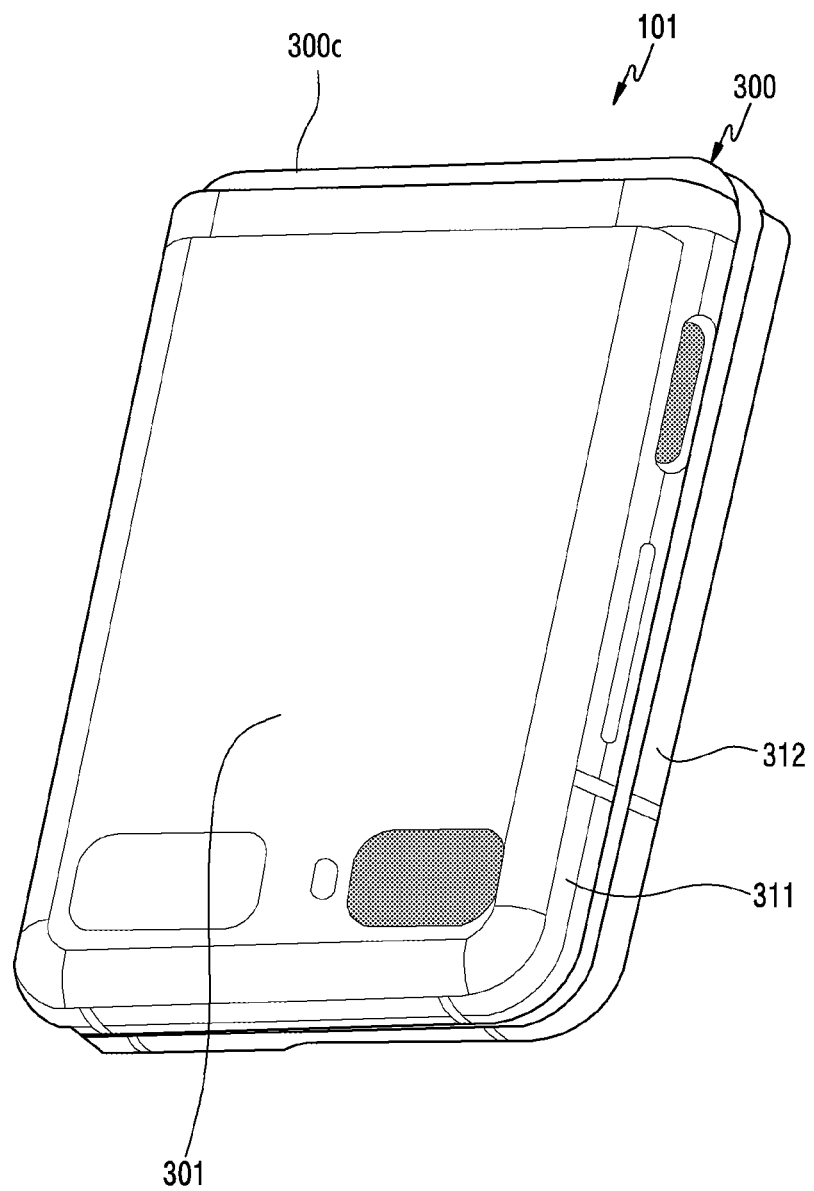
FIG. 3A is a perspective view of a foldable electronic device in a folded state according to various embodiments.
Figure 3B:
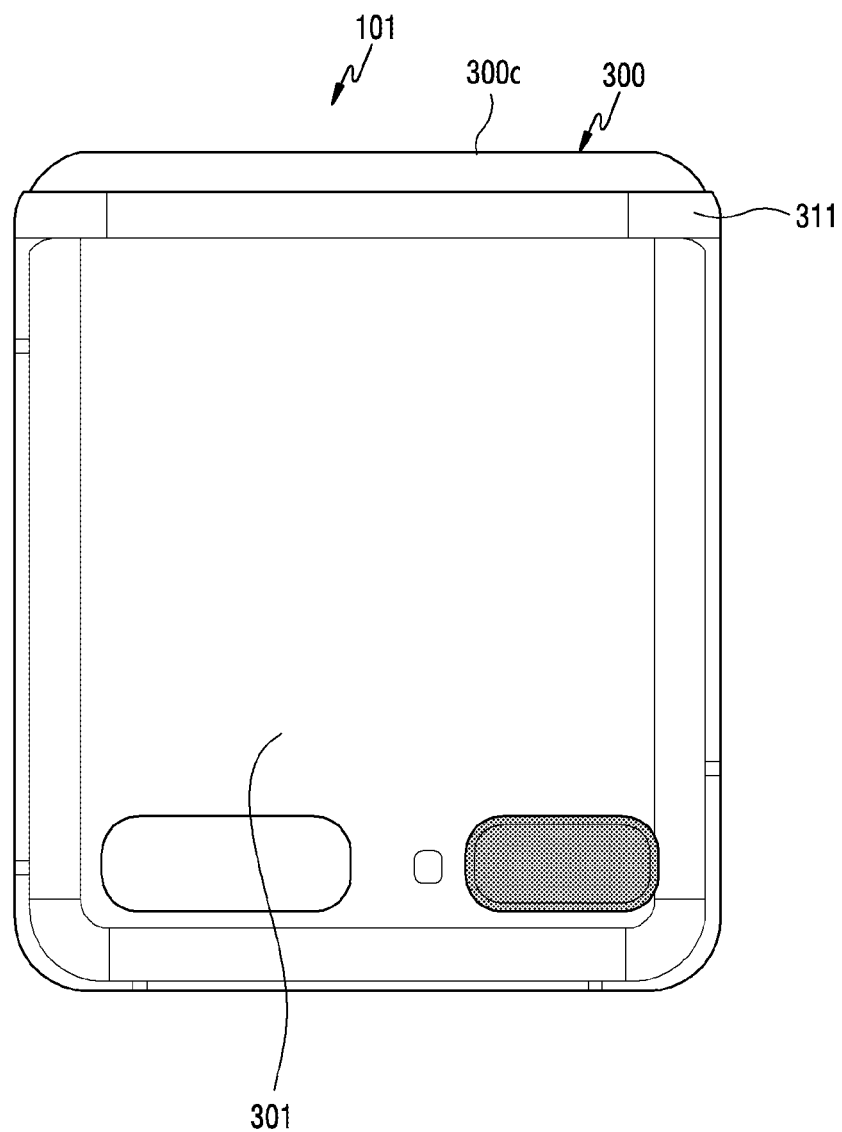
FIG. 3B is a front view of a foldable electronic device in a folded state according to various embodiments.
Figure 3C:
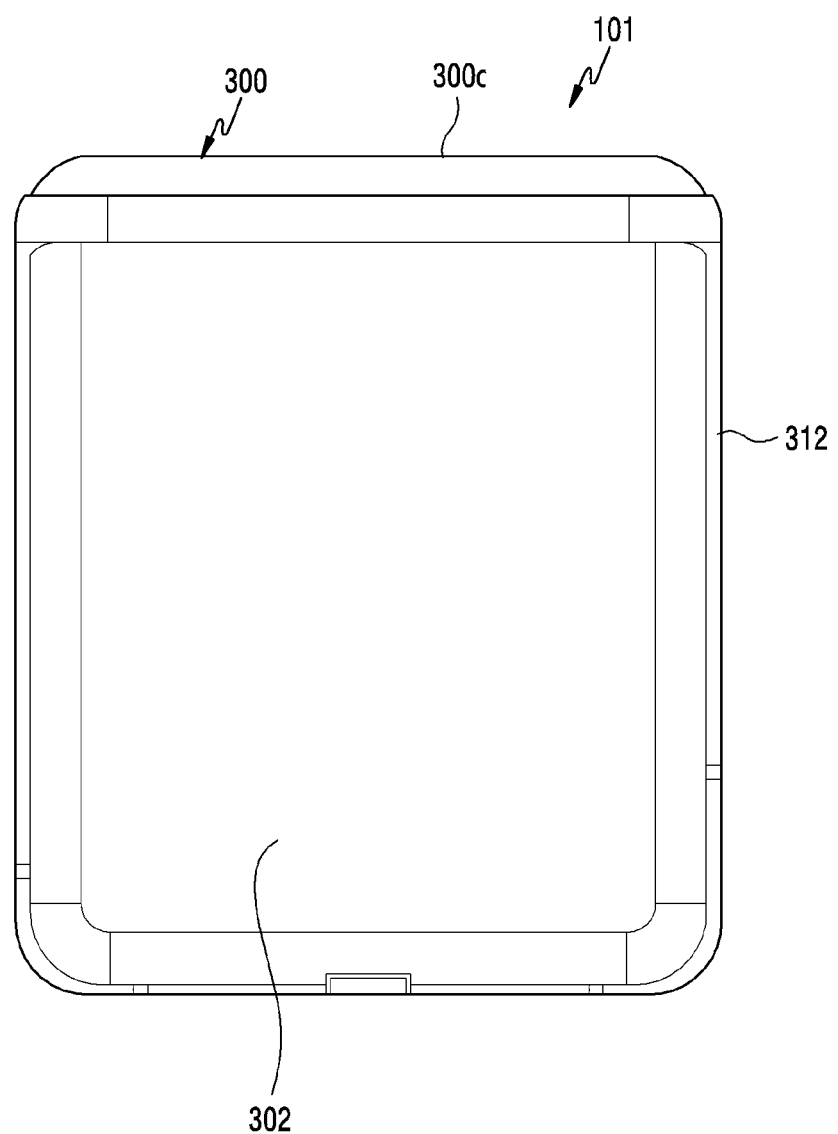
FIG. 3C is a rear view of a foldable electronic device in a folded state according to various embodiments
Figure 4A:
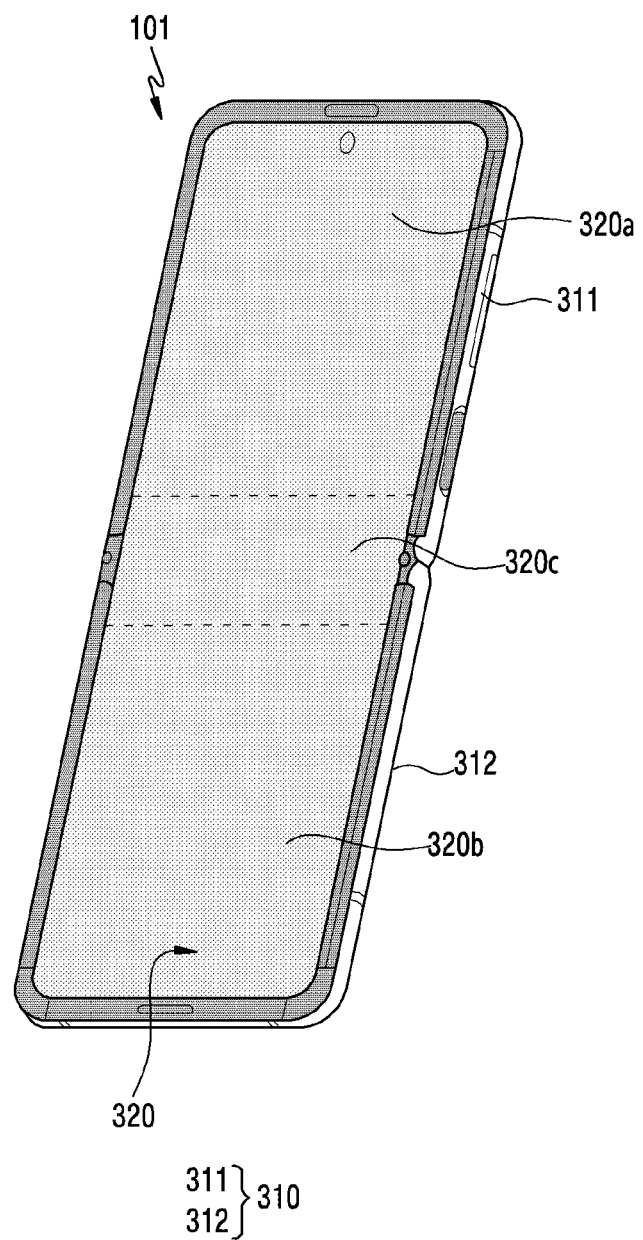
FIG. 4A is a perspective view of a foldable electronic device in a state of being unfolded by 180 degrees according to various embodiments.
Figure 4B:
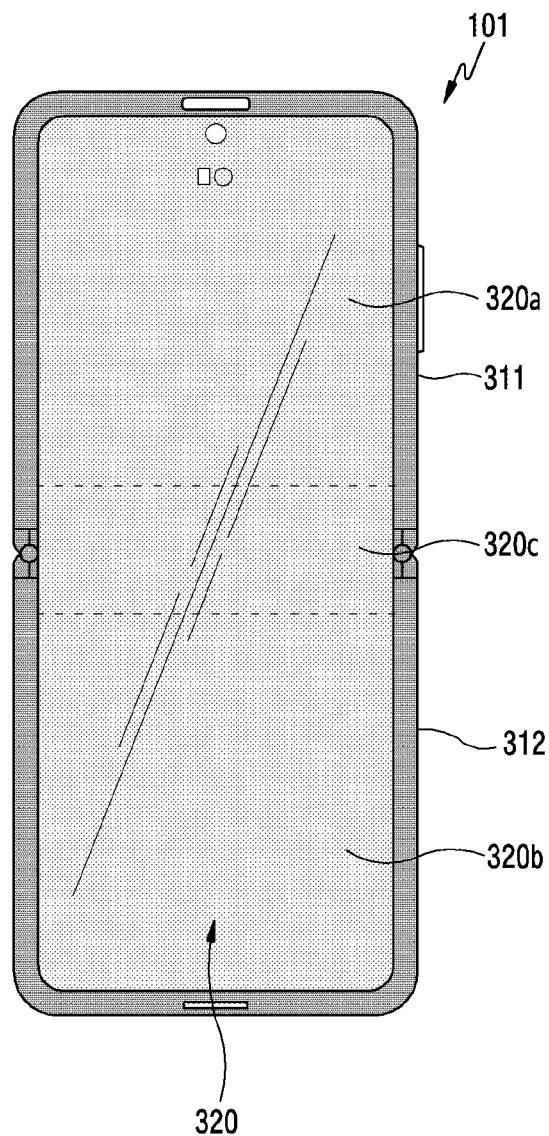
FIG. 4B is a front view of a foldable electronic device in a state of being unfolded by 180 degrees according to various embodiments
Figure 4C:
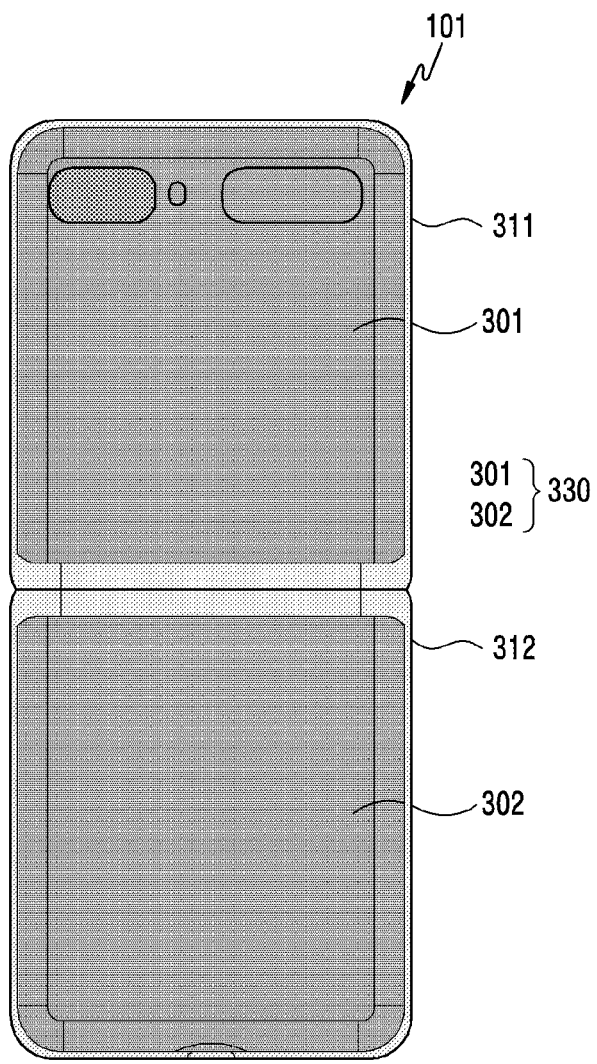
FIG. 4C is a rear view of a foldable electronic device in a state of being unfolded by 180 degrees according to various embodiments

FIGS. 3A, 3B and 3C are diagrams illustrating various views of a foldable electronic device according to various embodiments in a folded state, in which FIG. 3A is a perspective view, FIG. 3B is a front view, and FIG. 3C is a rear view. FIGS. 4A, 4B and 4C are diagrams illustrating various views of a foldable electronic device according to various embodiments in an unfolded state, in which FIG. 4A is a perspective view, FIG. 4B is a front view, and FIG. 4C is a rear view.

Referring to FIGS. 3A, 3B, 3C, 4A, 4B and 4C, an electronic device 101 (e.g., the electronic device 101 of FIG. 1) according to an embodiment may include a foldable housing 310 (or a "housing") including a first housing 311 and a second housing 312, a flexible housing 320, a flexible display 320, a hinge assembly 300, and a cover 330 (or a "rear surface cover"). In an embodiment, the cover 330 may include a first cover 301 included in the first housing 311 and a second cover 302 included in the second housing 312.

According to an embodiment, the first housing 311 and the second housing 312 may define a space in which electronic components (e.g., a printed circuit board, a battery, and/or a processor) of the electronic device 101 may be disposed and may define the side surface of the electronic device 101. As an example, various types of components for performing various functions of the electronic device 101 may be disposed inside the first housing 311 and the second housing 312. For example, electronic components such as a front camera, a receiver, and/or a sensor (e.g., a proximity sensor) may be disposed inside the first housing 311 and the second housing 312.

As an example, the first housing 311 and the second housing 312 may be disposed side by side when the electronic device 101 is in the unfolded state. As another example, when the electronic device 101 is in the folded state, the first housing 311 may rotate (or turn) relative to the second housing 312, so that one surface of the first housing 311 and one surface of the second housing 312 may be disposed to face each other.

According to an embodiment, the first housing 311 and the second housing 312 may define a recess accommodating the flexible display 320, and the flexible display 320 may be seated in the recess to be supported by the first housing 311 and the second housing 312. The first housing 311 and the second housing 312 may be made of a metal material and/or a non-metal material having predetermined (e.g., specified) rigidity to support the flexible display 320.

According to an embodiment, the flexible display 320 may be disposed on the first housing 311 and the second housing 312 to define the front surface of the electronic device 101 when the electronic device 101 is in the unfolded state. That is, the flexible display 320 may extend from one area of the first housing 311 to at least one area of the second housing 312 across the hinge assembly 300. According to an embodiment, the flexible display 320 may be seated in the recess defined by the first housing 311 and the second housing 312 to be disposed on the first housing 311 and the second housing 312.

In an example, the flexible display 320 may include a first area 320a corresponding to at least one area of the first housing 311, a second area 320b corresponding to at least one area of the second housing 312, and a folding area 320c located between the first area 320a and the second area 320b and having a flexible characteristic. However, the disclosure is not limited to the above-described embodiment, and according to an embodiment, all of the first area 320a, the second area 320b, and the folding area 320c of the flexible display 320 may have the flexible characteristic.

In an embodiment, the first area 320a, the folding area 320c, and the second area 320b may be disposed side by side while facing the same direction when the electronic device 101 is in the unfolded state.

Unlike this, when the electronic device 101 is in the folded state, the folding area 320c may be bent so that the first area 320a and the second area 320b face each other.

According to an embodiment, at least one area (e.g., the first area 320a and the second area 320b) of the flexible display 320 may be attached to one surface of the first housing 311 and one surface of the second housing 312.

According to an embodiment, the flexible display 320 may be attached to one surface of the first housing 311 and one surface of the second housing 312.

According to an embodiment, the hinge assembly 300 interconnect the first housing 311 and the second housing 312 to allow the second housing 312 to rotate relative to the first housing 311 within a predetermined (e.g., specified) rotation range or on the contrary, to allow the first housing 311 to rotate relative to the second housing 312 within a predetermined (e.g., specified) rotation range.

In an example, a recess may be defined in an area where the first housing 311 and the second housing 312 are connected to each other, and the hinge assembly 300 may be disposed between the first housing 311 and the second housing 312. The above-described recess may be defined in a groove shape having a constant curvature as an example, but is not limited thereto.

According to an embodiment, the hinge housing 300c may be disposed between the first housing 311 and the second housing 312, and the hinge assembly 300 may be assembled to the hinge housing 300c. In an embodiment, the hinge housing 300c may be referred to as a hinge cover.

According to an embodiment, the hinge housing 300c may be visible from the outside of the electronic device 101 or covered by the foldable housing 310 depending on the state of the electronic device 101. As an example (e.g., see FIG. 4C), when the electronic device 101 is in the unfolded state, the hinge housing 300c may be covered by the foldable housing 310 and may be invisible from the outside of the electronic device 101. As another example (e.g., see FIGS. 3A to 3C), when the electronic device 101 is in the folded state, the hinge housing 300c may be visible from the outside of the electronic device 101 by rotating the first housing 311 and the second housing 312.

Figure 5A:
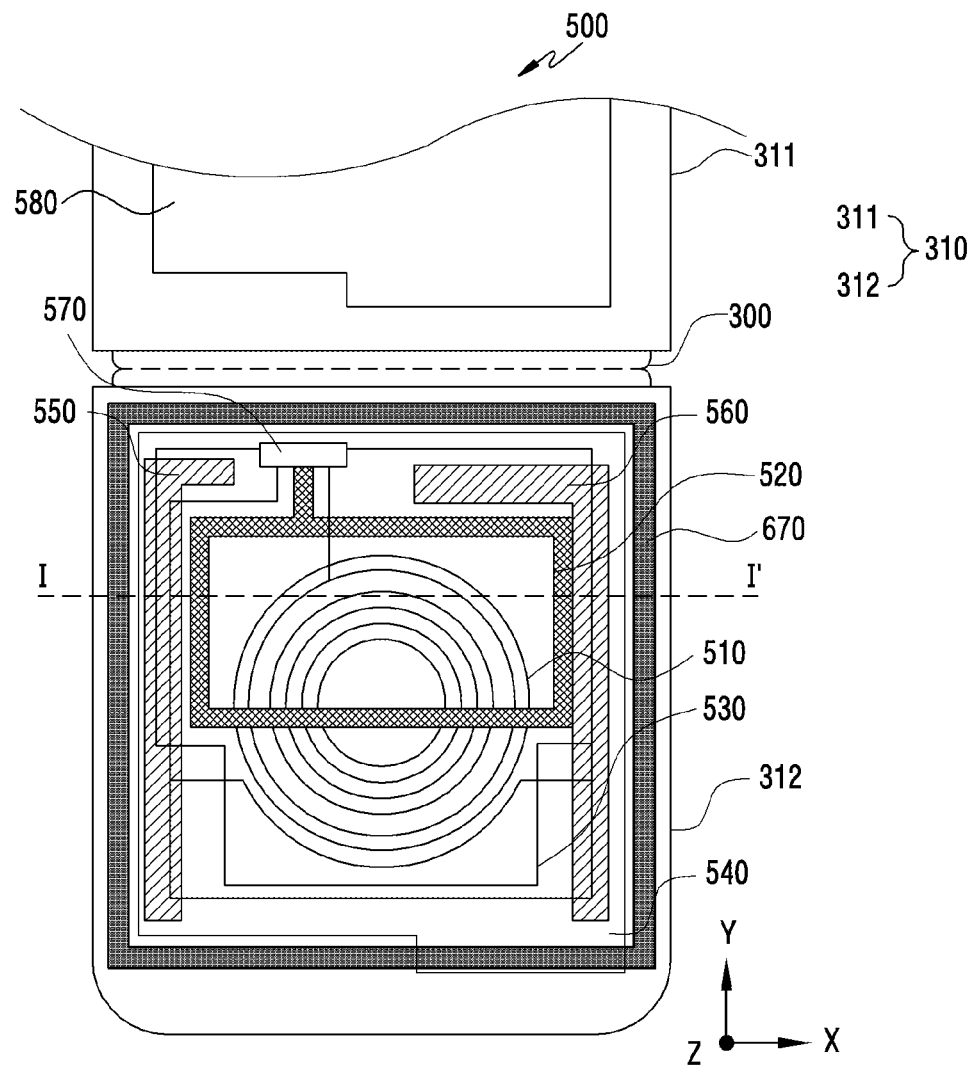
FIG. 5A is a diagram illustrating coil antennas and a flexible printed circuit board disposed in a housing of an electronic device according to various embodiments.
Figure 5B:
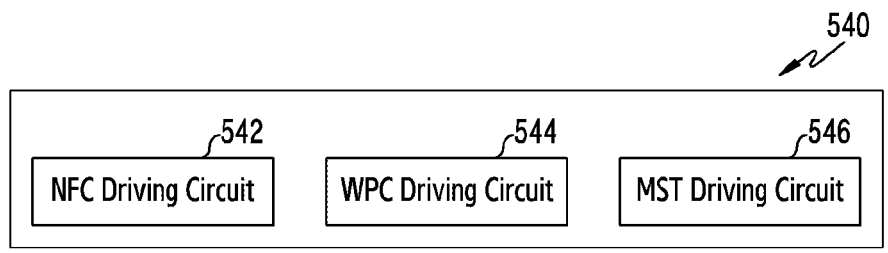
FIG. 5B is a diagram illustrating that an NFC driving circuit, a WPC driving circuit, and an MST driving circuit are disposed on a PCB according to various embodiments.
Figure 6:
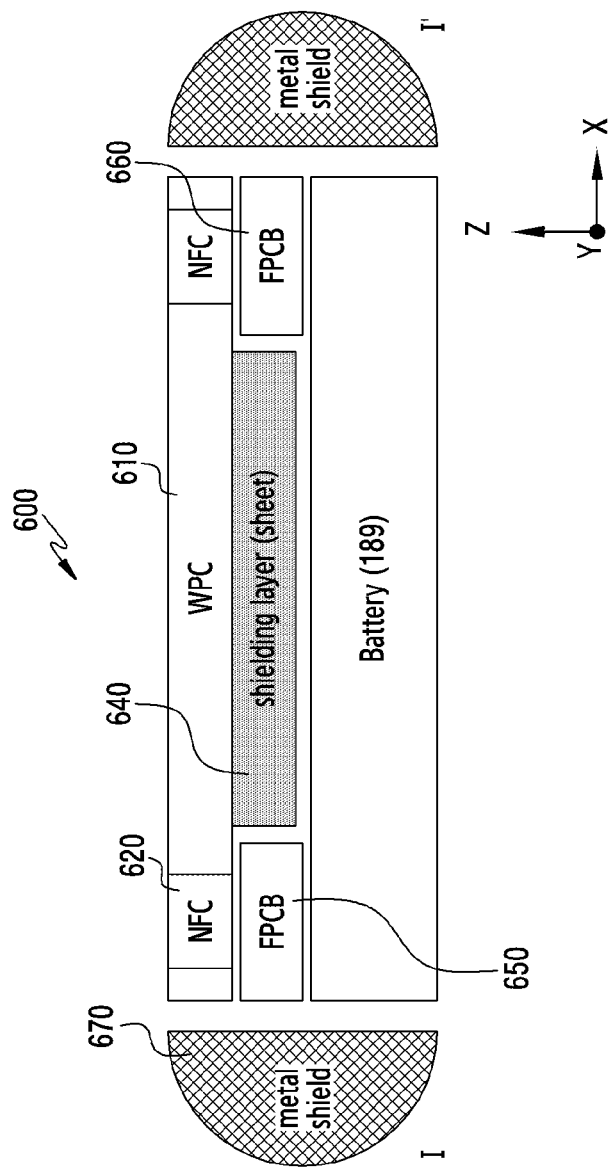
FIG. 6 is a cross-sectional view taken along line I-I' of FIG. 5A according to various embodiments.

FIG. 5A is a diagram illustrating coil antennas and a flexible printed circuit board disposed in a housing of an electronic device according to various embodiments. FIG. 5B is a diagram illustrating an NFC driving circuit, a WPC driving circuit, and an MST driving circuit disposed on a PCB according to various embodiments. FIG. 6 is a cross-sectional view taken along line I-I' indicated in FIG. 5A according to various embodiments.

Referring to FIGS. 5A, 5B and 6, an electronic device 500 or 600 (e.g., the electronic device 101 of FIG. 1) according to various embodiments of the disclosure may include a foldable housing 310 including a first housing 311 (e.g., the first housing 311 of FIG. 3A) and a second housing 312 (e.g., the second housing 312 of FIG. 3A), a flexible display 320, a hinge assembly 300, and a cover (e.g., the cover 330 of FIG. 4C). The hinge assembly 300 interconnect the first housing 311 and the second housing 312, and the first housing 311 and the second housing 312 may be folded or unfolded by the hinge assembly 300.

According to an embodiment, the first housing 311 and the second housing 312 may define a space in which electronic components (e.g., a printed circuit board, a battery, and/or a processor) of the electronic device 101 may be disposed. In addition, the first housing 311 and the second housing 312 may define at least a portion of the side surface of the electronic device 500 (e.g., the electronic device 101 of FIG. 1 or the electronic device 101 of FIG. 3A).

As an example, multiple electronic components (e.g., a printed circuit board, a processor, a memory, a camera, a broadcast reception module, and/or a communication module) of the electronic device 500 may be disposed inside the first housing 311 and the second housing 312. The printed circuit board may include a printed circuit board (PCB), a printed board assembly (PBA), and/or a flexible printed circuit board (FPCB).

As an example, a flexible display (e.g., the flexible display 320 of FIG. 4A) may be disposed on the first housing 311 (e.g., the first housing 311 of FIG. 3A) and the second housing 312 (e.g., the second housing 312 of FIG. 3A). A processor, a memory, a camera, and/or a communication module may be disposed in the first housing 311. As an example, in the second housing 312, coil antennas 510, 520, and 530, a printed circuit board (PCB) 540 (or a printed circuit board assembly (PBA)), multiple flexible circuit boards 550 and 560, a connector 570, and a metal shield 670 may be disposed.

The coil antennas 510, 520, and 530 may include a wireless power consortium (WPC) 510, a near field communication (NFC) 520, and/or a magnetic secure transmission (MST) 530. As an example, only the NFC 520 may be disposed in the electronic device 500, or the WPC 510 or the MST 530 may be disposed together with the NFC 520. As an example, the WPC 510 and the MST 530 may be disposed in the electronic device 500. As an example, the NFC 520, the WPC 510, and the MST 530 may all be disposed in the electronic device 500.

The PCB 540 may include an NFC driving circuit 542 configured to drive the NFC 520, a WPC driving circuit 544 configured to drive the WPC 510, and an MST driving circuit 546 configured to drive the MST 530. The NFC 520, the WPC 510, and the MST 530 may be electrically connected to the PCB 540 via the connector 570.

As an example, among multiple flexible printed circuit boards 650 and 660, a first FPCB 650 may include a connector-to-connector (C2C) FPCB configured to transmit control signals between the PCB 580 (or a PBA) disposed in the first housing 311 and the PCB 540 (or a PBA) disposed in the second housing 312.

As an example, among multiple FPCB 650 and 660, a second FPCB 660 may include a flexible radio frequency cable (FRC) FPCB configured to transmit RF signals between the PCB 580 (or a PBA) disposed in the first housing 311 and the PCB 540 (or a PBA) disposed in the second housing 312.

As an example, WPCs 510 and 610 and NFCs 520 and 620 may be disposed above the battery 189 in the Z-axis direction within the second housing 312.

As an example, the WPCs 510 and 610 may be disposed in the central portion of the second housing 312 with reference to the X axis, and the NFCs 520 and 620 may be disposed on opposite sides of the WPC 510. The MST 530 may be disposed below the WPCs 510 and 610 in the second housing 312 with reference to the Z axis.

As an example, the shielding layer (or a shielding sheet) 640 may be made of a layer or sheet made of a material capable of blocking magnetic fields. The shielding layer 640 may be made in a single layer or multilayer structure of a material having high a magnetic permeability (e.g., ferrite or nano crystal).

As an example, the shielding layer 640 may be disposed below the WPCs 510 and 610. The shielding layer 640 may be disposed between the WPCs 510 and 610 and the battery 189.

As an example, the shielding layer 640 may be disposed on a layer that is at least partially the same as the FPCBs 650 and 660. For example, the shielding layer 640 may be disposed between a first FPCB 650 and a second FPCB 660 with reference to the X-axis direction. The disclosure is not limited thereto, and the position and thickness of the shielding layer 640 may be changed.

As an example, the NFCs 520 and 620 may be disposed above the battery 189 with reference to the Z-axis direction within the second housing 312. Multiple FPCBs 650 and 660 may be disposed between the NFCs 520 and 620 and the battery 189.

As an example, when viewed in the Z-axis direction, among the multiple FPCBs 650 and 660, a first FPCB 650 may be disposed to at least partially overlap the NFCs 520 and 620 disposed on a first side of the WPCs 510 and 610. Among the multiple FPCBs 650 and 660, a second FPCB 660 may be disposed to at least partially overlap the NFCs 520 and 620 disposed on a second side of the WPCs 510 and

610. A metal shield 670 may be disposed to surround the side surfaces of the NFC 620 and the multiple FPCBs 650 and 660.

As an example, the metal shield 670 may be made of a metal material (e.g., aluminum) to block magnetic fields in the −Z axis direction generated from the coil antennas 610 and 620. The metal shield 670 may be made of a paramagnetic material, a diamagnetic material, and/or a ferromagnetic material.

As an example, the metal shield 670 may be made of multiple metal members. For example, the metal shield 670 may include two, three, four, or five metal members. For example, each metal member may be made of a paramagnetic material, a diamagnetic material, and/or a ferromagnetic material. For example, all of the multiple metal members of the metal shield 670 may be made of a paramagnetic material, a diamagnetic material, or a ferromagnetic material. For example, at least one of the multiple metal members of the metal shield 670 may be made of a paramagnetic material, at least one of the multiple metal members may be made of a diamagnetic material, and the remaining some metal members may be made of a ferromagnetic material.

As an example, the metal shield 670 may be made of aluminum, stainless steel, magnesium, gold, silver, copper, iron, or a combination of at least two of the above materials.

As an example, the metal shield 670 may be integrated with a housing (e.g., the second housing 312 of FIG. 5A). For example, at least a portion of the metal shield 670 may be fabricated in the state of being included in a housing (e.g., the second housing 312 of FIG. 5A).

As an example, the shielding layer 640 may not be disposed on the NFC 620 to reduce the thickness of the area where the NFC 620 is disposed. Here, when there is no shielding layer 640 under the NFC 620, the magnetic fields generated by the NFC 620 may be unnecessarily radiated to the −Z-axis direction rather than being radiated to a desired direction, causing interference. The electronic devices 500 and 600 of the disclosure may block magnetic fields in the −Z axis direction by the metal shield 670 disposed outside the coil antennas (e.g., the NFCs 520 and 620) and may allow magnetic fields generated from the coil antennas (e.g., the NFCs 520 and 620) to be radiated in a desired direction (e.g., the Z-axis direction).

Figure 7A:
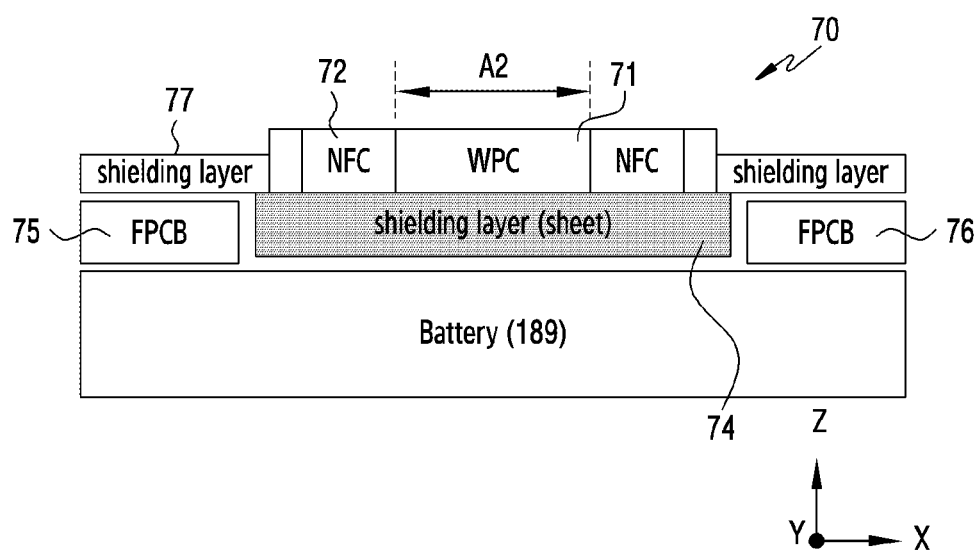
FIG. 7A is a diagram illustrating in comparison an arrangement structure of coil antennas, flexible printed circuit boards, and shielding layers according to various embodiments.

FIG. 7A is a diagram illustrating in comparison an arrangement structure of coil antennas, flexible printed circuit boards, and shielding layers according to various embodiments.

Referring to FIG. 7A, an electronic device 70 may include coil antennas 71 and 72, multiple shielding layers 74 and 77, multiple FPCBs 75 and 76, and a battery 189. NFCs 72 may be disposed on opposite sides of a WPC 71, and a first shielding layer 74 may be disposed under the WPC 71 and the NFCs 72. FPCBs 75 and 76 may be disposed on side surfaces of the NFC 72 and the shielding layer 74, and a second shielding layer 77 may be disposed on the FPCBs 75 and 76. In this way, when the structure of the coil antennas 71 and 72, the shielding layers 74 and 77, and the FPCBs 75 and 76 are applied, the area where the WPC 71 is disposed may have a first width A1 (or a first distance).

Figure 7B:
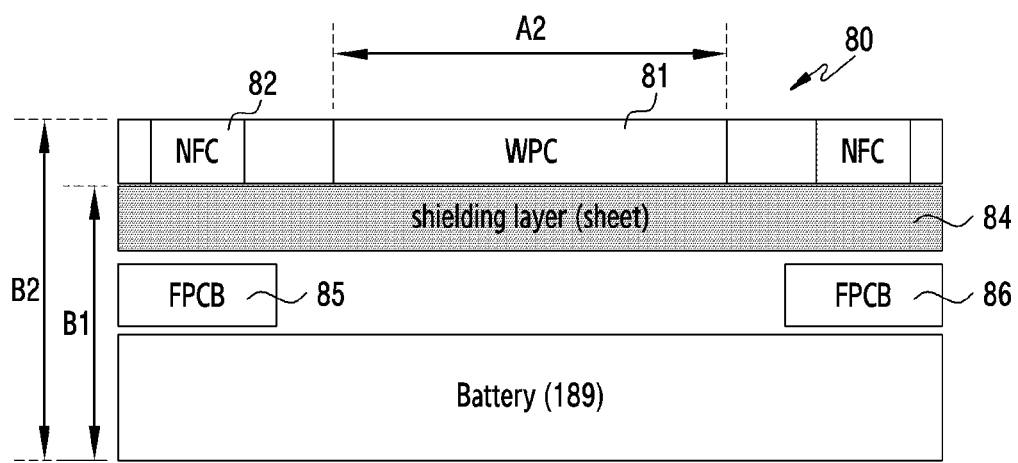
FIG. 7B is a diagram illustrating in comparison an arrangement structure of coil antennas, flexible printed circuit boards, and shielding layers according to various embodiments.

The height from the lower end of the battery 189 to the upper end of the coil antennas 71 and 72 may be a first height B1 (refer to FIG. 7B). When this structure is applied, a space for disposing the battery 189 may be ensured in the electronic device 70 by reducing the thickness of the structure. However, since it is necessary to place all the WPC 71 and the NFCs 72 within the shielding area of the first shielding layer 74, the area of the WPC 71 may be reduced.

FIG. 7B is a diagram illustrating in comparison an arrangement structure of coil antennas, flexible printed circuit boards, and shielding layers according to various embodiments.

Referring to FIG. 7B, an electronic device 80 may include coil antennas 81 and 82, a shielding layer 84, multiple FPCBs 85 and 86, and a battery 189. In order to ensure the area of the WPC 81, NFCs 82 may be disposed above the first FPCB 85 and the second FPCB 86. To block the magnetic fields of the WPC 81 and the NFCs 82, the shielding layer 84 may be disposed below the WPC 81 and the NFCs 82. In this way, when the structure of the coil antennas 81 and 82, the shielding layers 84, and the FPCBs 85 and 86 is applied, the area where the WPC 81 is disposed may have a second width A2 (or a second distance) greater than the first width A1 (or the first distance), and the height from the lower end of the battery 189 to the upper end of the coil antennas 81 and 82 may be a second height B2 greater than the first height B1. When this structure is applied, the area of the WPC 81 may be increased in the electronic device 80 by disposing the NFCs 82 at positions overlapping the FPCBs 85 and 86. However, the thickness B2 (or the height B2) from the lower end of the battery 189 to the upper end of the coil antennas 81 and 82 may be increased. When the thickness of the electronic device 80 is not increased, the total capacity of the battery 189 may be reduced because it is necessary to reduce the thickness of the battery 189.

In this case, in the electronic device 80, the shielding layer 84 between the NFC 82 and the FPCBs 85 and 86 may be removed, and the thickness of the battery 189 may be increased. However, since the shielding layer 84 does not exist under the NFCs 82, magnetic fields may be radiated in the −Z-axis direction, resulting in deterioration in performance of the NFCs 82 and occurrence of interference.

Figure 7C:
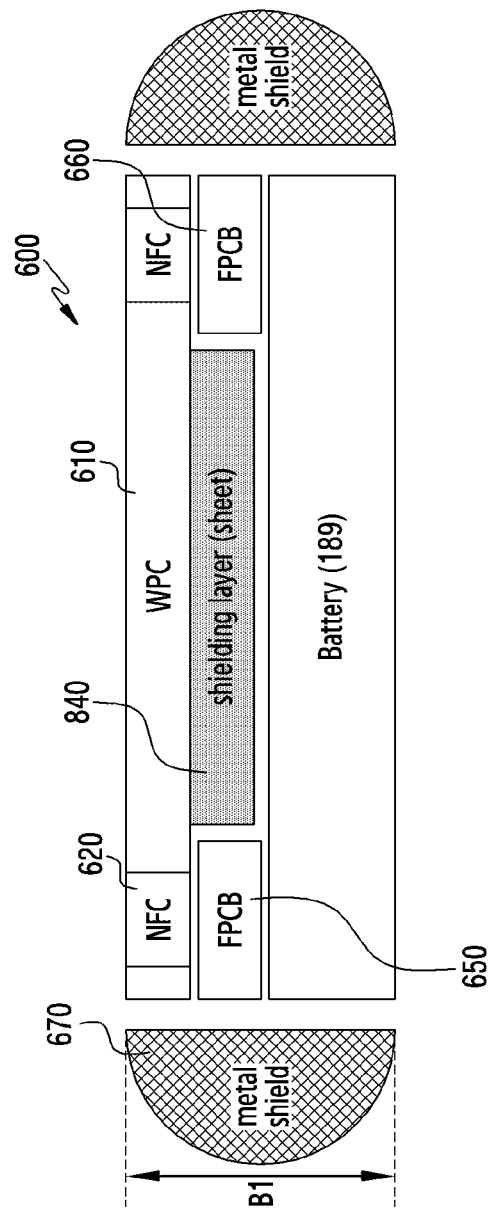
FIG. 7C is a diagram illustrating in comparison an arrangement structure of coil antennas, flexible printed circuit boards, and shielding layers according to various embodiments.

FIG. 7C is a diagram illustrating in comparison an arrangement structure of coil antennas, flexible printed circuit boards, and shielding layers according to various embodiments.

Referring to FIG. 7C, a shielding layer 840 may be disposed below a WPC 610 among the coil antennas 610 and 620, and the shielding layer 840 may not be disposed below NFCs 620. The NFCs 620 may be disposed to overlap the FPCBs 650 and 660, and the area where the WPC 610 is disposed may have the second width A2 (or the second distance) greater than the first width A1 (or the first distance). The height from the lower end of the battery 189 to the upper end of the coil antennas 610 and 620 may be the first height B1. A metal shield 670 may be disposed to surround the side surfaces of the coil antennas 610 and 620 and the multiple FPCBs 650 and 660. With the metal shield 670, the electronic device 600 may block magnetic fields in the −Z axis direction generated from the coil antennas 610 and 620 and may allow the magnetic fields generated from the coil antennas 610 and 620 in a desired direction.

Figure 8A:
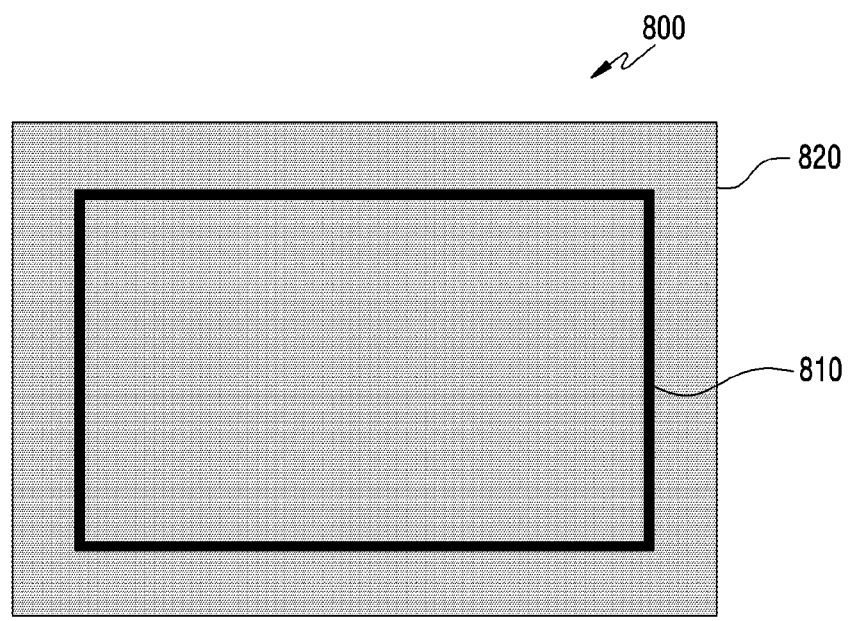
FIG. 8A is a diagram illustrating a shape of magnetic fields generated in a coil antenna due to an arrangement of a shielding layer according to various embodiments.
Figure 8B:
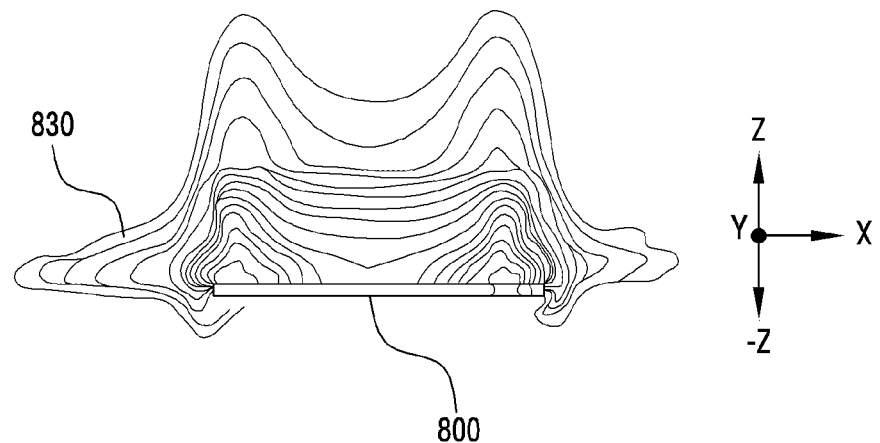
FIG. 8B is a diagram illustrating a shape of magnetic fields generated in a coil antenna due to an arrangement of a shielding layer according to various embodiments.

FIGS. 8A and 8B are diagrams illustrating shapes of magnetic fields generated in a coil antenna due to an arrangement of a shielding layer according to various embodiments.

Referring to FIGS. 6, 8A and 8B, a simulation result of magnetic fields 830 radiated from a coil antenna 810 when a shielding layer 820 was disposed under the coil antenna 810 (e.g., an NFC) to cover the entire coil antenna 810 (e.g., an NFC) of the electronic device 800 is shown. Here, the coil antenna 810 is simplified and expressed based on an NFC, and the NFC may include one or more turns. The distribution of magnetic fields 830 when the magnetic permeability of the NFC coil was configured with a 150 mu shielding agent and a current of 350 mA was applied to the NFC is shown. It may be identified that when the shielding layer 820 was provided over a range greater than the outer diameter of the coil antenna 810 (e.g., an NFC), the magnetic fields 830 in the −Z axis direction were blocked and the magnetic fields 830 in the Z axis direction were radiated.

Figure 9A:
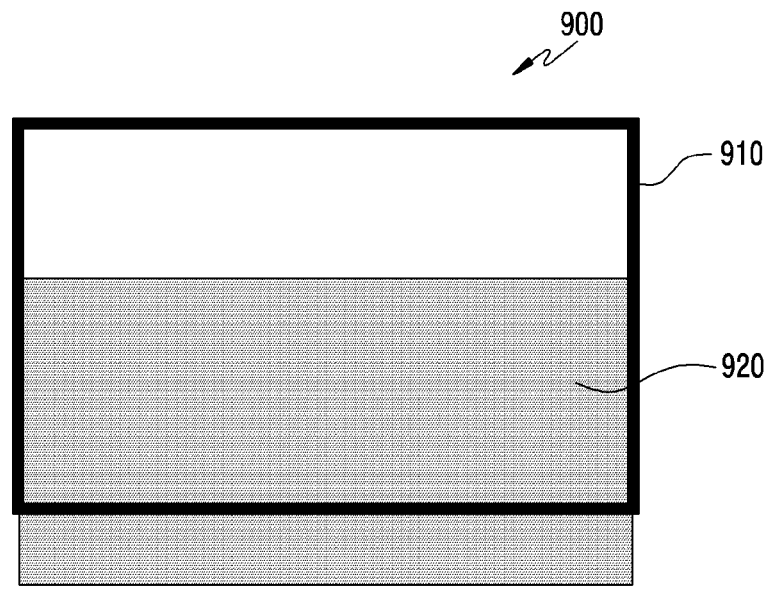
FIG. 9A is a diagram illustrating a shape of magnetic fields generated in a coil antenna due to an arrangement of a shielding layer according to various embodiments.
Figure 9B:
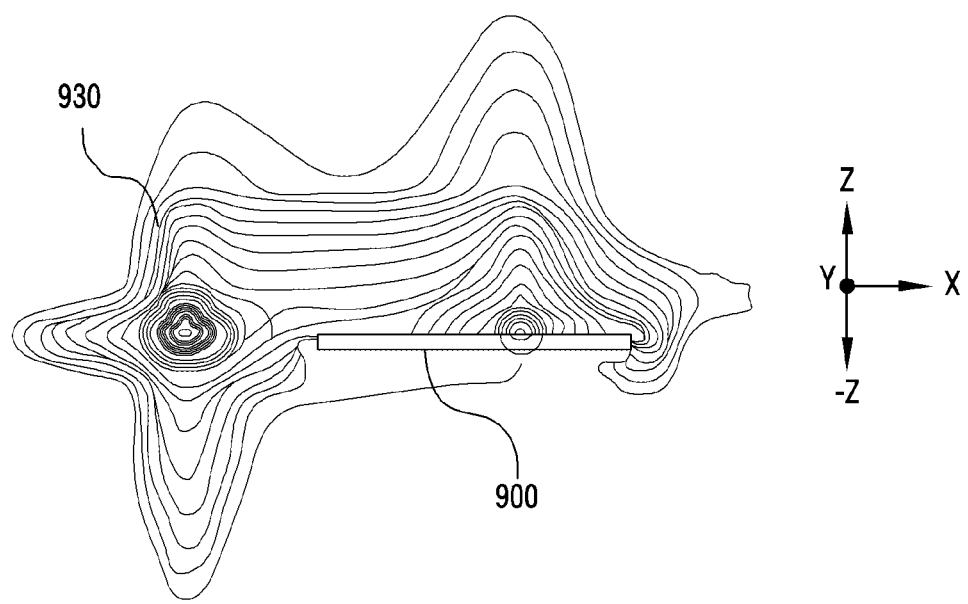
FIG. 9B is a diagram illustrating a shape of magnetic fields generated in a coil antenna due to an arrangement of a shielding layer according to various embodiments.

FIGS. 9A and 9B are diagrams illustrating shapes of magnetic fields generated in a coil antenna due to an arrangement of a shielding layer according to various embodiments.

Referring to FIGS. 9A and 9B, a simulation result of magnetic fields 930 radiated from a coil antenna 910 when a shielding layer 920 was disposed under the coil antenna 910 (e.g., an NFC) to cover a partial area of the coil antenna 910 (e.g., an NFC) of the electronic device 900 is shown. Here, the coil antenna 810 is simplified and expressed based on an NFC, and the NFC may include one or more turns. The distribution of magnetic fields 930 when the magnetic permeability of the NFC coil was configured with a 150 mu shielding agent and a current of 350 mA was applied to the NFC is shown. It may be identified that when the shielding layer 920 was provided to cover a partial area of the coil antenna 910 (e.g., an NFC), some of the magnetic fields 930 in the −Z axis direction were blocked and the magnetic fields 930 in the Z axis direction were radiated. It may be identified that some of the magnetic fields 930 are radiated in the −Z-axis direction in a portion where the shielding layer 920 is not disposed.

Figure 10A:
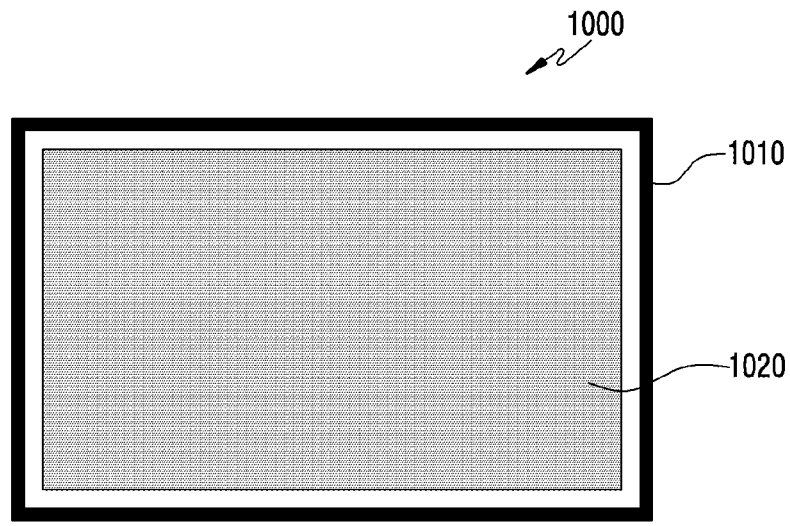
FIG. 10A is a diagram illustrating a shape of magnetic fields generated in a coil antenna due to an arrangement of a shielding layer according to various embodiments.
Figure 10B:
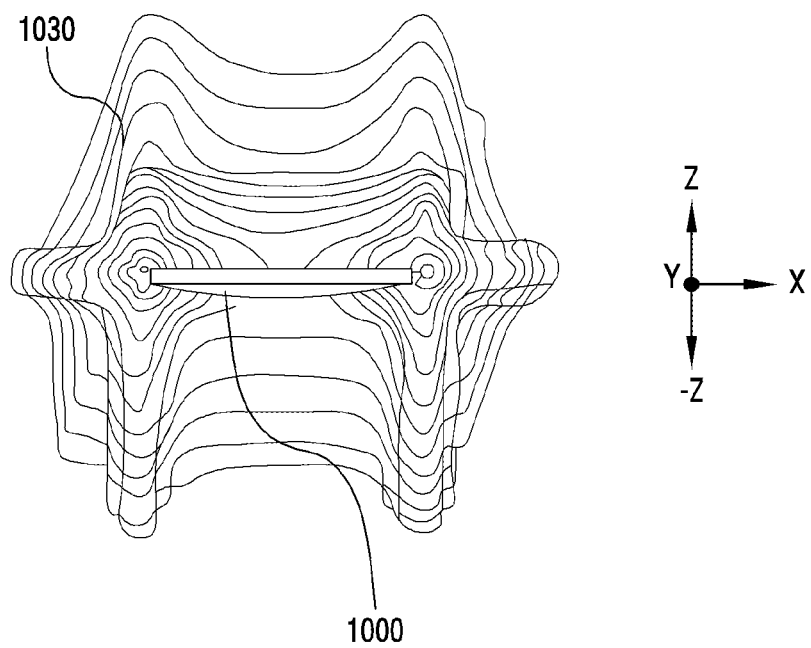
FIG. 10B is a diagram illustrating a shape of magnetic fields generated in a coil antenna due to an arrangement of a shielding layer according to various embodiments.

FIGS. 10A and 10B are diagrams illustrating shapes of magnetic fields generated in a coil antenna due to an arrangement of a shielding layer according to various embodiments.

Referring to FIG. 10, a simulation result of magnetic fields 1030 radiated from a coil antenna 1010 when a shielding layer 1020 was disposed under the coil antenna 1010 (e.g., an NFC) to cover an area smaller than the coil antenna 1010 (e.g., an NFC) of the electronic device 1000 is shown. Here, the coil antenna 1010 is simplified and expressed based on an NFC, and the NFC may include one or more turns. The distribution of magnetic fields 1030 when the magnetic permeability of the NFC coil was configured with a 150 mu shielding agent and a current of 350 mA was applied to the NFC is shown. It may be identified that when the shielding layer 1020 was smaller than the area of the coil antenna 1010 (e.g., an NFC), the magnetic fields 1030 in the −Z-axis direction are radiated without being blocked. Magnetic fields 1030 are radiated in the −Z-axis direction in a portion where the shielding layer 1020 is not disposed, and thus NFC performance is deteriorated and interference caused by the magnetic fields may be caused.

Figure 11:
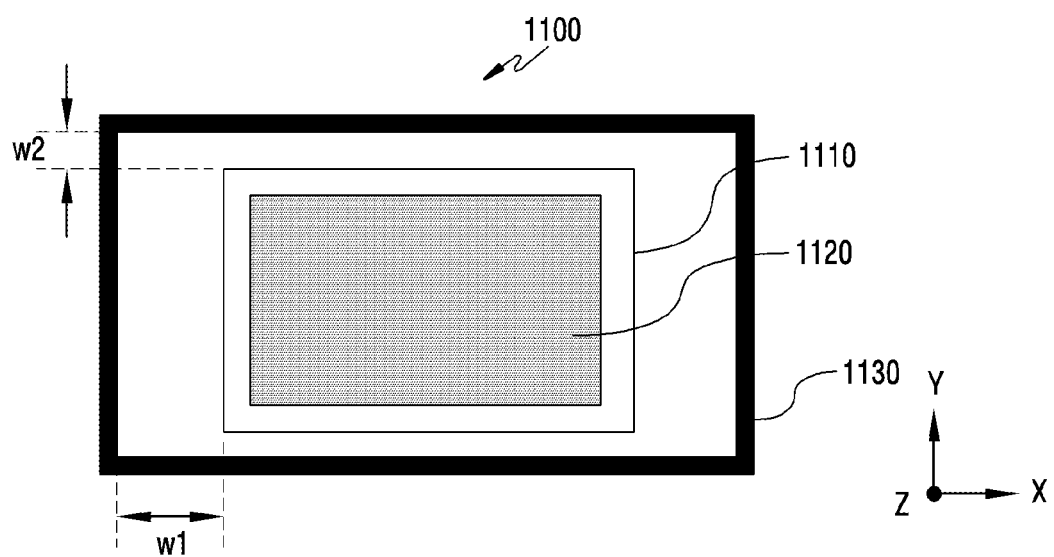
FIG. 11 is a diagram illustrating a metal shield (e.g., a front metal) disposed to surround a shielding area according to various embodiments.

FIG. 11 is a diagram illustrating a metal shield (e.g., a front metal) disposed to surround a shielding area according to various embodiments.

Referring to FIGS. 6 and 11, in the electronic device 600 or 1100 (e.g., the electronic device 101 of FIG. 1) according to various embodiments of the disclosure, coil antennas may include NFCs 620 or 1110 and a WPC 610. Without being limited thereto, the coil antennas may include NFC 620s or 1110, a WPC 610, and an MST (e.g., the MST 530 of FIG. 5).

The NFCs 620 or 1110 and the WPC 610 may be disposed at the same height with reference to the Z-axis direction. The NFCs 620 or 1110 may be disposed above the FPCBs 650 and 660. A shielding layer 640 or 1120 may be disposed to cover an area smaller than that of the NFCs 620 or 1110. As illustrated in FIG. 6, the shielding layer 1120 may be disposed below the WPC 610 with reference to the Z-axis direction to cover the WPC 610. The shielding layer 640 may be disposed between the WPC 510 or 610 and the battery 189.

A metal shield 670 or 1130 may be disposed to surround side surfaces of the NFCs 620 or 1110. As an example, the metal shield 670 or 1130 may block magnetic fields in the −Z axis direction among the magnetic fields generated by the NFCs 620 or 1110. The metal shield 670 or 1130 may be made of a paramagnetic material, a diamagnetic material, or a ferromagnetic material.

The metal shield 670 or 1130 may be spaced apart from the NFCs 620 or 1110 by a first width w1 in the X-axis direction. As an example, the metal shield 670 or 1130 may be spaced apart from the NFCs 620 or 1110 by 2 mm to 100 m in the X-axis direction.

The metal shield 670 or 1130 may be spaced apart from the NFCs 620 or 1110 by a second width w2 in the Y-axis direction. As an example, the metal shield 670 or 1130 may be spaced apart from the NFCs 620 or 1110 by 0.1 mm to 5.0 m in the Y-axis direction.

Since the metal shield 670 or 1130 is disposed to surround the side surfaces of the NFCs 620 or 1110 at predetermined (e.g., specified) intervals in the X-axis and Y-axis directions from the NFCs 620 or 1110, in the electronic device, the magnetic fields in the −Z-axis direction generated by the NFCs 620 or 1110 may be blocked. As such, in the electronic device, the metal shield 670 or 1130 may block the magnetic fields in the −Z axis direction and may allow the magnetic fields generated by the NFCs 620 or 1110 to radiate in a desired direction (e.g., the Z axis direction).

Figure 12:
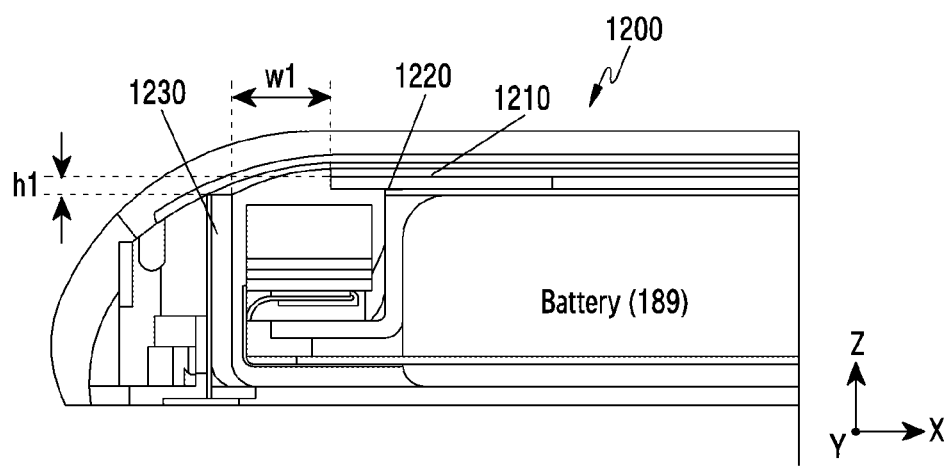
FIG. 12 is a cross-sectional view illustrating an example of a distance between a metal shield (e.g., a front metal) and a shielding area according to various embodiments.

FIG. 12 is a cross-sectional view illustrating an example of a distance between a metal shield (e.g., a front metal) and a shielding area according to various embodiments.

Referring to FIGS. 6 and 12, an electronic device 1200 according to an embodiment of the disclosure may include a front metal 1230 for disposing a battery 189, an NFC 1210, and an FPCB 1220.

In the disclosure, the front metal 1230 may be made of a paramagnetic, diamagnetic, or ferromagnetic metal to replace the metal shield 670 of FIG. 6. That is, in the electronic device, the metal shield 670 may be implemented with the front metal 1230 without providing a separate metal shield to shield the magnetic fields in the −Z-axis direction.

Here, the front metal 1230 (e.g., the metal shield) may be spaced apart from the NFC 1210 by a first width w1 in the X-axis direction. As an example, the front metal 1230 (e.g., the metal shield) may be spaced apart from the NFC 1210 by 2 mm to 5 mm in the X-axis direction. In addition, the front metal 1230 (e.g., the metal shield) may be spaced apart from the lower end of the NFC 1210 by a first height h1 in the Z-axis direction. As an example, the front metal 1230 (e.g., the metal shield) may be spaced apart from the lower end of the NFC 1210 by 0.2 mm to 2.0 mm in the Z-axis direction.

By disposing the front metal 1230 (e.g., the metal shield) in the lateral direction of the coil antennas 610 and 620 and the multiple FPCBs 650 and 660, in the electronic device, the front metal 1230 (e.g., the metal shield) may block the magnetic fields in the −Z-axis direction generated from the NFCs 620 and may allow the magnetic fields generated from the coil antennas 610 and 620 to be radiated in a desired direction. That is, even if the front metal 1230 (e.g., the metal shield) is disposed lower than the NFC 1210 in the Z-axis direction and is spaced apart from the NFC 1210 by a predetermined (e.g., specified) distance, among the magnetic fields generated by the NFCs 1210, the magnetic fields in the −Z-axis direction may be shielded.

Referring to FIG. 7C, the shielding layer 640 may be disposed below the WPC 610 among the coil antennas 610 and 620, and the shielding layer 640 may not be disposed below the NFC 620. The NFCs 620 may be disposed to overlap the FPCBs 650 and 660, and the area where the WPC 610 is disposed may have the second width A2 (or the second distance) greater than the first width A1 or (or the first distance). As the area where the WPC 610 is to be disposed is increased, a wider WPC 610 may be provided. As an example, in the structure illustrated in A, the WPC 610 may have a diameter up to 33 mm. In the structure illustrated in of FIG. 7C and FIG. 12, the WPC 610 may have a diameter of about 42 mm. Through this, a recognition area and charging efficiency of wireless charging may be improved.

Figure 13A:
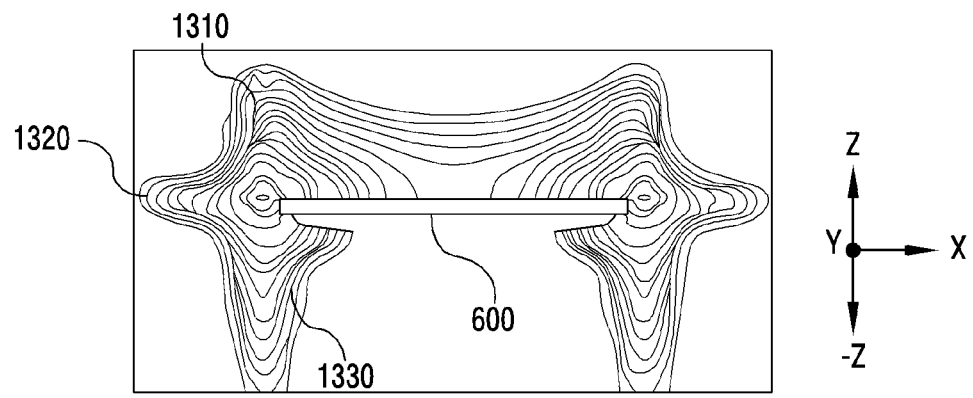
FIG. 13A is a diagram illustrating a shape of magnetic fields when a metal shield (e.g., a front metal) is made of a paramagnetic material according to various embodiments.
Figure 13B:
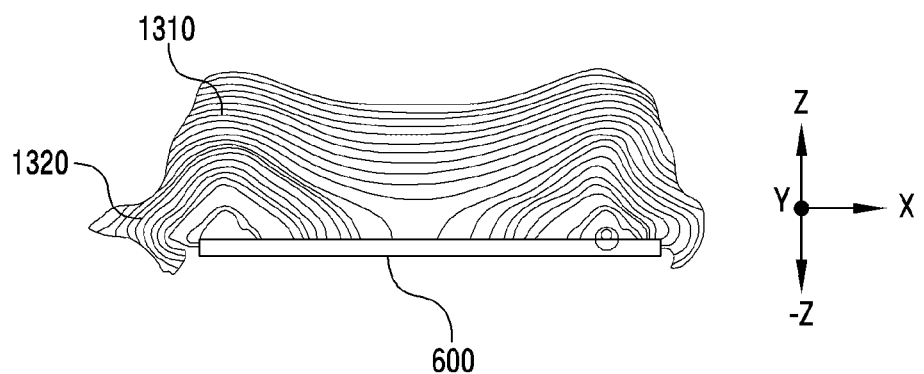
FIG. 13B is a diagram illustrating a shape of magnetic fields when a metal shield (e.g., a front metal) is made of a paramagnetic material according to various embodiments.

FIGS. 13A and 13B are diagrams illustrating shapes of magnetic fields when a metal shield (e.g., a front metal) was made of a paramagnetic material according to various embodiments.

Referring to FIGS. 13A and 13B, the front metal 1230 (e.g., the metal shield 670) may be made of a paramagnetic metal material. Here, the front metal 1230 (e.g., the metal shield 670) may be made of aluminum. However, the disclosure is not limited thereto, and the front metal 1230 (e.g., the metal shield 670) may be material of a metal that satisfies a magnetic permeability (Mu). The magnetic permeability of the front metal 1230 (e.g., the metal shield 670) made of a paramagnetic material may be about 1 (Mu=1).

Figure 14A:
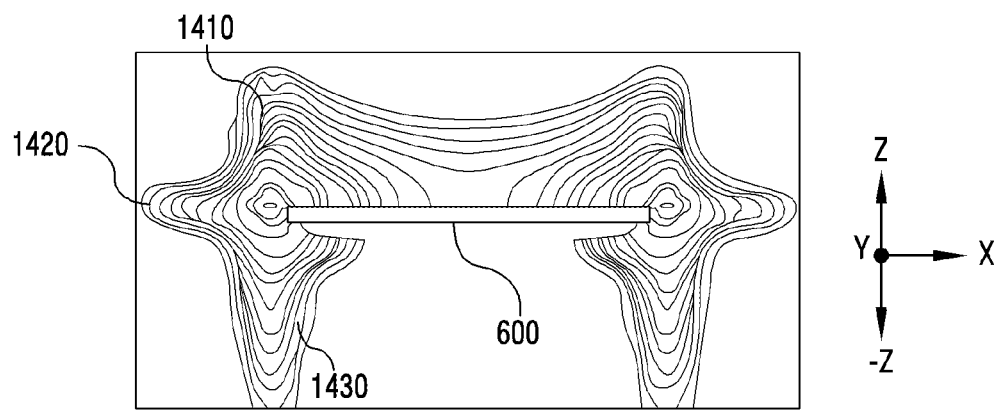
FIG. 14A is a diagram illustrating a shape of magnetic fields when a metal shield (e.g., a front metal) is made of a diamagnetic material according to various embodiments.
Figure 14B:
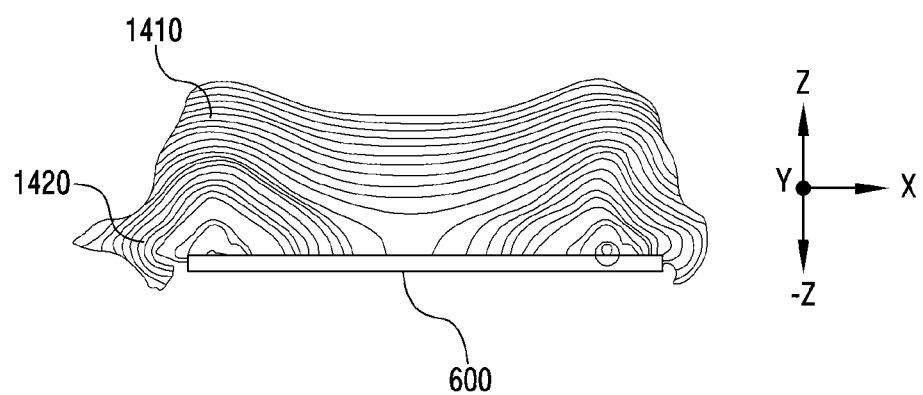
FIG. 14B is a diagram illustrating a shape of magnetic fields when a metal shield (e.g., a front metal) is made of a diamagnetic material according to various embodiments.

FIGS. 14A and 14B are diagrams illustrating shapes of magnetic fields when a metal shield (e.g., a front metal) was made of a diamagnetic material according to various embodiments.

Referring to FIGS. 14A and 14B, the front metal 1230 (e.g., the metal shield 670) may be made of a diamagnetic metal material. Here, the front metal 1230 (e.g., the metal shield 670) may be made of aluminum. However, the disclosure is not limited thereto, and the front metal 1230 (e.g., the metal shield 670) may be made of a metal that satisfies a diamagnetic permeability (Mu). The magnetic permeability of the front metal 1230 (e.g., the metal shield 670) made of a diamagnetic material may be about 0.5 (Mu=0.5).

Figure 15A:
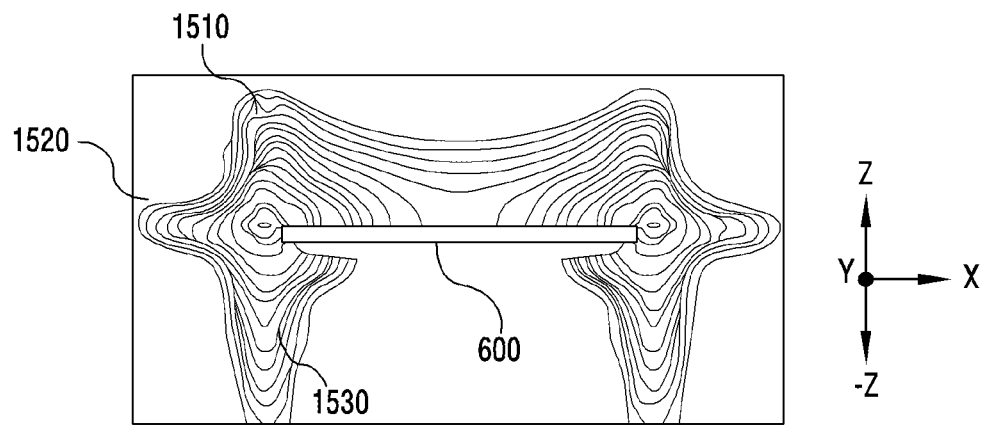
FIG. 15A is a diagram illustrating a shape of magnetic fields when a metal shield (e.g., a front metal) is made of a ferromagnetic material according to various embodiments.
Figure 15B:
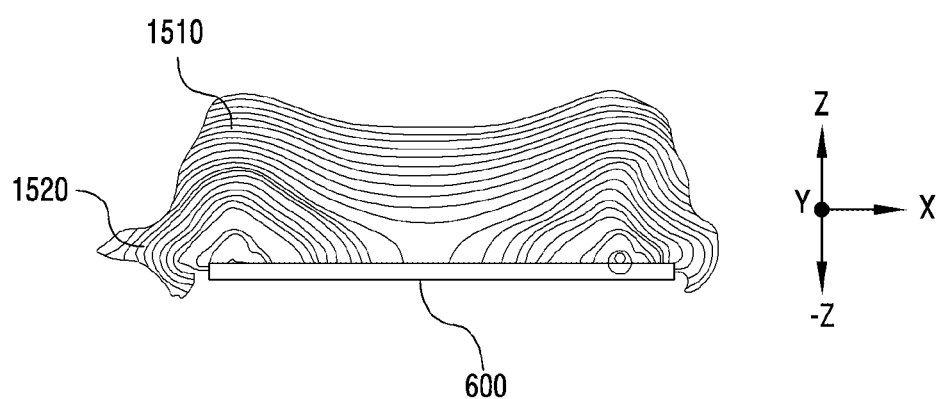
FIG. 15B is a diagram illustrating a shape of magnetic fields when a metal shield (e.g., a front metal) is made of a ferromagnetic material according to various embodiments.

FIGS. 15A and 15B are diagrams illustrating shapes of magnetic fields when a metal shield (e.g., a front metal) was made of a ferromagnetic material according to various embodiments.

Referring to FIG. 15, the front metal 1230 (e.g., the metal shield 670) may be made of a ferromagnetic metal material. Here, the front metal 1230 (e.g., the metal shield 670) may be made of aluminum. However, the disclosure is not limited thereto, and the front metal 1230 (e.g., the metal shield 670) may be made of a metal that satisfies a ferromagnetic permeability (Mu). The magnetic permeability of the front metal 1230 (e.g., the metal shield 670) made of a ferromagnetic material may be about 150 (Mu=150).

Referring to FIGS. 13A, 13B, 14A, 14B, 15A and 15B, the figures show distributions of magnetic fields obtained by performing simulations assuming that a front metal 1230 (e.g., the metal shield 670) is spaced apart from an NFC (e.g., the NFC 620 in FIG. 6 or the NFC 1120 in FIG. 12) by 100 mm in the X-axis direction and 5 mm in the Y-axis direction.

It may be identified that when the front metal 1230 (e.g., the metal shield 670) is made of a paramagnetic material, a diamagnetic material, or a ferromagnetic material, the magnetic fields in the −Z-axis direction are blocked.

As an example, as shown in FIG. 13A, when the front metal 1230 (e.g., the metal shield 670) is not applied to the electronic device 600, it may be identified that the magnetic fields 1310 in the Z-axis direction, the magnetic fields in the X-axis direction 1320 and the magnetic fields 1330 in the −Z-axis direction are radiated.

As an example, as shown in FIG. 13B, when a paramagnetic front metal 1230 (e.g., the metal shield 670) is applied to the electronic device 600, the magnetic fields 1330 in the −Z axis direction are blocked.

As an example, as shown in (FIG. 14A, when the front metal 1230 (e.g., the metal shield 670) is not applied to the electronic device 600, it may be identified that the magnetic fields 1410 in the Z-axis direction, the magnetic fields 1420 in the X-axis direction and the magnetic fields 1430 in the −Z-axis direction are radiated.

As an example, as shown in FIG. 14B, when a diamagnetic front metal 1230 (e.g., the metal shield 670) is applied to the electronic device 600, the magnetic fields 1430 in the −Z axis direction are blocked.

As an example, as shown in FIG. 15A, when the front metal 1230 (e.g., the metal shield 670) is not applied to the electronic device 600, it may be identified that the magnetic fields 1510 in the Z-axis direction, the magnetic fields in the X-axis direction 1520 and the magnetic fields 1530 in the −Z-axis direction are radiated.

As an example, as shown in FIG. 15B, when a ferromagnetic front metal 1230 (e.g., the metal shield 670) is applied to the electronic device 600, the magnetic fields 1530 in the −Z axis direction are blocked.

When the front metal (1230, e.g., the metal shield 670) is made of a paramagnetic, diamagnetic, or ferromagnetic material, the effect of blocking the magnetic fields in the −Z axis direction may be obtained. However, a material that is most suitable for an electronic device may be identified from among a paramagnetic material, a diamagnetic material, or a ferromagnetic material by analyzing the distribution of magnetic fields.

As shown in FIGS. 13A and 13B, when a paramagnetic front metal 1230 (e.g., the metal shield 670) is applied to an electronic device 600, a distribution in which magnetic fields stick to the surface of the metal appears. As shown in FIGS. 14A and 14B, when a diamagnetic front metal 1230 (e.g., the metal shield 670) is applied to the electronic device 600, a distribution in which magnetic fields pass through the metal appears.

As shown in FIGS. 15A and 15B, when a ferromagnetic front metal 1230 (e.g., the metal shield 670) is applied to the electronic device 600, a distribution in which magnetic fields are formed as if covering the surface of the metal appears. All the paramagnetic, diamagnetic, and ferromagnetic materials may obtain the effect of blocking magnetic fields, but in view of the easy of application of a metal material and the level of suppressing the magnetic fields in the −Z axis direction, it may be effective to apply the front metal 1230 (e.g., the metal shield 670) made of a paramagnetic material.

As another example, an effect of blocking magnetic fields may be obtained even when a metal wire having a thickness of about 1 mm is placed around an NFC without applying a front metal 1230 (e.g., the metal shield 670) to the electronic device. Here, in order to block magnetic fields in the −Z-axis direction, it is necessary the metal wire at a position lower than the NFC in the Z-axis direction. When the metal wire is disposed at a position higher than the NFC in the Z-axis direction, magnetic fields in the Z-axis direction may be blocked. Here, the distance between the NFC and the metal wire does not greatly affect the performance of blocking magnetic fields, but the magnetic fields in the −Z-axis direction may be blocked by disposing the metal wire adjacent to the NFC (e.g., within 10 mm).

An electronic device according to an example embodiment of the disclosure is capable of blocking magnetic fields in the −Z axis direction generated from an antenna coil (e.g., an NFC, a WPC, and/or an MST) and is capable of ensuring thickness reduction to ensure a battery space. An electronic device according to an embodiment of the disclosure is capable of blocking magnetic fields in the −Z axis direction generated from an antenna coil (e.g., an NFC, a WPC, and/or an MST) while reducing the area of a shielding layer, and is capable of improving a recognition area and charging efficiency of wireless charging by expanding the area of a WPC.

An electronic device according to an example embodiment may include: a housing, a first circuit board disposed in the housing, a flexible circuit board electrically connected to the first circuit board, a coil antenna disposed inside the housing and including a plurality of antennas on which a conductive pattern is provided and configured to generate magnetic fields, a shielding layer disposed below a first antenna among the plurality of antennas, and a metal shield disposed on a side surface of the coil antenna and configured to shield a magnetic field in a first direction among the magnetic fields generated by the coil antenna.

According to an example embodiment, the metal shield may be spaced apart from the coil antenna by a first distance in the first direction and spaced apart from the coil antenna by a second distance in a second direction.

According to an example embodiment, the metal shield may be spaced apart from the coil antenna in a range of 2 mm to 100 mm in the first direction.

According to an example embodiment, the metal shield may be spaced apart from the coil antenna in a range of 0.1 mm to 5.0 mm in the second direction.

According to an example embodiment, the metal shield may be spaced apart from the lower end of the coil antenna in a range of 0.2 mm to 2.0 mm in the third direction.

According to an example embodiment, the metal shield may be disposed at a position lower than a lower end of the coil antenna.

According to an example embodiment, the metal shield may shield a magnetic field in the −z axis direction.

According to an example embodiment, the flexible printed circuit board may overlap a second antenna among the plurality of antennas, and the shielding layer may be disposed to not overlap the second antenna.

According to an example embodiment, the coil antenna may include a wireless power consortium (WPC) antenna, a near-field communication (NFC) antenna, and a magnetic secure transmission (MST) antenna.

According to an example embodiment, the first antenna may include the WPC antenna, and the second antenna may include the NFC antenna.

According to an example embodiment, the metal shield may include one of a paramagnetic material, a diamagnetic material, and a ferromagnetic material.

According to an example embodiment, the metal shield may comprise a paramagnetic material having a magnetic permeability (Mu) of about 1.

According to an example embodiment, the metal shield may comprise a diamagnetic material having a magnetic permeability (Mu) of about 0.5.

According to an example embodiment, the metal shield may comprise a ferromagnetic material having a magnetic permeability (Mu) of about 150.

An electronic device according to an example embodiment may include: a first housing, a second housing, a hinge disposed between the first housing and the second housing and configured to enable the first housing and the second housing to be folded or unfolded, a first printed circuit board disposed in the first housing, a second printed circuit board disposed in the second housing, a flexible circuit board electrically interconnecting the first printed circuit board and the second printed circuit board, a coil antenna disposed inside the second housing and including a plurality of antennas on which a conductive pattern is provided and configured to generate magnetic fields, a shielding layer disposed below a first antenna among the plurality of antennas, and a metal shield disposed on a side surface of the coil antenna and configured to shield a magnetic field in a first direction among the magnetic fields generated by the coil antenna.

According to an example embodiment, the metal shield is spaced apart from the coil antenna in a range of 2 mm to 100 mm in the first direction, and the metal shield is spaced apart from the coil antenna in a range of 0.1 mm to 5.0 mm in a second direction, and the metal shield may be spaced apart from the lower end of the coil antenna in a range of 0.2 mm to 2.0 mm in the third direction.

According to an example embodiment, the metal shield may be disposed at a position lower than a lower end of the coil antenna.

According to an example embodiment, the metal shield may shield a magnetic field in the −z axis direction.

According to an example embodiment, the metal shield may include one of a paramagnetic material, a diamagnetic material, and a ferromagnetic material, and the metal shield may comprise a paramagnetic material having a magnetic permeability (Mu) of about 1, a diamagnetic material having a diamagnetic material having a magnetic permeability (Mu) of about 0.5, or a ferromagnetic material having a magnetic permeability (Mu) of about 150.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a first printed circuit board (PCB) disposed in the housing;
a plurality of coil antennas configured to generate magnetic fields, wherein the plurality of coil antennas comprises at least a first antenna and a second antenna;
a shielding layer disposed to overlap with at least a portion of the first antenna and disposed not to overlap with the second antenna;
a first flexible printed circuit board (FPCB) electrically connected to the first PCB and disposed to overlap with at least a portion of the second antenna; and
a metal shield disposed to surround the plurality of coil antennas and configured to shield at least a portion of the magnetic fields.

2. The electronic device of claim 1, wherein the metal shield is configured to shield a magnetic field in a first direction from the first antenna toward the shielding layer.

3. The electronic device of claim 1, wherein the metal shield comprises one of a paramagnetic material, a diamagnetic material, and a ferromagnetic material.

4. The electronic device of claim 1, further comprising:
a battery,
wherein the shielding layer is disposed between the first antenna and the battery, and
wherein the first FPCB is disposed between the second antenna and the battery.

5. The electronic device of claim 4, further comprising:
a second PCB; and
a second FPCB,
wherein the second FPCB is disposed between the second antenna and the battery, and
wherein each of the first FPCB and the second FPCB electrically connects the first PCB and the second PCB.

6. The electronic device of claim 5, wherein the metal shield is disposed to surround the plurality of coil antennas, the first FPCB and the second FPCB.

7. The electronic device of claim 5, wherein the shielding layer is disposed between the first FPCB and the second FPCB.

8. The electronic device of claim 1, wherein the metal shield is spaced apart from the first antenna by a specific distance.

9. The electronic device of claim 1, wherein the housing includes a first housing and a second housing which is rotatable with respect to the first housing, and
wherein the plurality of coil antennas are disposed in the second housing.

10. The electronic device of claim 1, further comprising:
a battery,
wherein the battery is surrounded by the metal shield.

11. The electronic device of claim 1, wherein the plurality of coil antennas comprise a third antenna.

12. The electronic device of claim 11, wherein the first antenna includes a wireless charging antenna,
wherein the second antenna includes a near field communication (NFC) antenna, and
wherein the third antenna includes a magnetic secure transmission (MST) antenna.

13. The electronic device of claim 1, wherein the first antenna is disposed on the shielding layer, and
wherein the second antenna is disposed above the first FPCB.

14. The electronic device of claim 1, wherein the shielding layer is disposed on a same face as the first FPCB.

15. The electronic device of claim 1, further comprising:
a plurality of circuits for driving the plurality of coil antennas, wherein the plurality of circuits are disposed on the first PCB; and
a connector included in the first PCB,
wherein the plurality of coil antennas are electrically connected with the plurality of circuits via the connector.

16. An electronic device comprising:
a first housing;
a second housing;
a hinge connecting the first housing and the second housing;
a first printed circuit board disposed in the first housing;
a second printed circuit board disposed in the second housing;
a flexible printed circuit board electrically connecting the first printed circuit board and the second printed circuit board;
a coil antenna disposed inside the second housing, including a plurality of antennas and configured to generate magnetic fields, wherein the plurality of antennas include a first antenna;
a shielding layer disposed below the first antenna; and
a metal shield disposed on a side surface of the coil antenna and configured to shield a magnetic field in a first direction among the magnetic fields generated by the coil antenna.

17. The electronic device of claim 16, wherein the metal shield is spaced apart from the coil antenna in a range of 2 mm to 100 mm in the first direction,
wherein the metal shield is spaced apart from the coil antenna in a range of 0.1 mm to 5.0 mm in a second direction, and
wherein the metal shield is spaced apart from a lower end of the coil antenna in a range of 0.2 mm to 2.0 mm in a third direction.

18. The electronic device of claim 17, wherein the metal shield is disposed at a position lower than a lower end of the coil antenna.

19. The electronic device of claim 18, wherein the metal shield is configured to shield a magnetic field in a −z axis direction.

20. The electronic device of claim 16, wherein the metal shield includes one of a paramagnetic material, a diamagnetic material, or a ferromagnetic material, and
wherein the metal shield includes the paramagnetic material having a magnetic permeability (Mu) of about 1, the diamagnetic material having a diamagnetic material having a magnetic permeability (Mu) of about 0.5, or the ferromagnetic material having a magnetic permeability (Mu) of about 150.

* * * * *